United States Patent
Lenz et al.

(10) Patent No.: US 10,711,102 B2
(45) Date of Patent: Jul. 14, 2020

(54) METHOD FOR ISOLATING A PHENYLENE ETHER OLIGOMER COMPOSITION AND PHENYLENE ETHER OLIGOMER COMPOSITION

(71) Applicant: SABIC GLOBAL TECHNOLOGIES B.V., Bergen Op Zoom (NL)

(72) Inventors: Douglas Henry Lenz, Troy, NY (US); Madhav Ghanta, Delmar, NY (US); Matias Bikel, Bergen op Zoom (NL)

(73) Assignee: SABIC GlOBAL TECHNOLOGIES B.V., Bergen Op Zoom (NL)

( * ) Notice: Subject to any disclaimer, the term of this patent is extended or adjusted under 35 U.S.C. 154(b) by 38 days.

(21) Appl. No.: 16/062,861

(22) PCT Filed: Nov. 14, 2016

(86) PCT No.: PCT/US2016/061822
§ 371 (c)(1),
(2) Date: Jun. 15, 2018

(87) PCT Pub. No.: WO2017/105705
PCT Pub. Date: Jun. 22, 2017

(65) Prior Publication Data
US 2018/0362711 A1   Dec. 20, 2018

Related U.S. Application Data

(60) Provisional application No. 62/268,229, filed on Dec. 16, 2015.

(51) Int. Cl.
*C08G 65/46* (2006.01)
*C08G 65/48* (2006.01)
(Continued)

(52) U.S. Cl.
CPC ............. *C08G 65/46* (2013.01); *B01D 1/225* (2013.01); *B01J 10/02* (2013.01); *C08G 65/485* (2013.01);
(Continued)

(58) Field of Classification Search
CPC ........................................................ C08G 65/46
(Continued)

(56) References Cited

U.S. PATENT DOCUMENTS

| | | |
|---|---|---|
| 3,306,874 A | 2/1967 | Hay |
| 4,994,217 A | 2/1991 | Banevicius et al. |

(Continued)

FOREIGN PATENT DOCUMENTS

| | | |
|---|---|---|
| JP | 2000281786 A | 10/2000 |
| JP | 2002003594 A | 1/2002 |

(Continued)

OTHER PUBLICATIONS

International Search Report for International Application No. PCT/US2016/061822, International Filing Date Nov. 14, 2016, dated Jan. 24, 2017, 6 pages.

(Continued)

Primary Examiner — Duc Truong
(74) Attorney, Agent, or Firm — Cantor Colburn LLP

(57) ABSTRACT

A method for isolating a phenylene ether oligomer composition includes feeding a solution including a solvent and a phenylene ether oligomer into a thin film evaporator, forming a film on an interior surface of the thin film evaporator, and heating to devolatilize the solvent from the film, to provide a phenylene ether oligomer composition. The thin film evaporator includes cylindrical heating chamber and a rotor having one or more rotor blades, wherein an edge of the one or more rotor blades and the interior surface of the cylindrical heating chamber are separated by a distance of (Continued)

0.5 to 3.5 millimeters. Phenylene ether oligomer compositions are also described.

15 Claims, 4 Drawing Sheets

(51) Int. Cl.
 *B01D 1/22* (2006.01)
 *B01J 10/02* (2006.01)
(52) U.S. Cl.
 CPC ...... *B01D 2202/00* (2013.01); *C08G 2650/34* (2013.01); *C08G 2650/50* (2013.01)
(58) Field of Classification Search
 USPC .......................................................... 528/491
 See application file for complete search history.

(56) References Cited

U.S. PATENT DOCUMENTS

| | | | |
|---|---|---|---|
| 5,084,134 A | 1/1992 | Mattiussi et al. |
| 5,256,250 A | 10/1993 | Pelzer |
| 5,419,810 A | 5/1995 | Van Der Piepen et al. |
| 5,573,635 A | 11/1996 | Van Der Piepen |
| 6,211,327 B1 | 4/2001 | Braat et al. |
| 6,307,010 B1 | 10/2001 | Braat et al. |
| 6,429,277 B1 | 8/2002 | Braat et al. |
| 6,485,607 B1 | 11/2002 | Elsner et al. |
| 6,534,619 B1 | 3/2003 | Elsner et al. |
| 6,545,122 B1 | 4/2003 | Elsner et al. |
| 6,576,700 B2 | 6/2003 | Patel |
| 6,627,040 B1 | 9/2003 | Elsner et al. |
| 6,860,766 B2 | 3/2005 | Parillo et al. |
| 6,860,966 B2 | 3/2005 | Parrillo et al. |
| 7,332,058 B2 | 2/2008 | Reimers |
| 7,524,405 B2 | 4/2009 | Sohn et al. |
| 7,585,935 B2 | 9/2009 | Hossan et al. |
| 7,619,042 B2 | 11/2009 | Poe et al. |
| 7,705,106 B2 | 4/2010 | Groer et al. |
| 7,838,618 B2 | 11/2010 | Hiramatsu et al. |
| 8,747,980 B2 | 6/2014 | Bikson et al. |
| 2004/0211657 A1 | 10/2004 | Ingelbrecht |
| 2006/0252906 A1 | 11/2006 | Godschalx et al. |
| 2008/0097069 A1 | 4/2008 | Guo et al. |
| 2012/0247688 A1 | 10/2012 | Gilron et al. |
| 2012/0312162 A1 | 12/2012 | Theodore et al. |
| 2013/0071594 A1 | 3/2013 | Bikson et al. |
| 2013/0225783 A1 | 8/2013 | Bates et al. |

FOREIGN PATENT DOCUMENTS

| | | |
|---|---|---|
| JP | 2003181423 A | 7/2003 |
| JP | 2003221440 A | 8/2003 |
| JP | 2004027161 A | 1/2004 |
| WO | 0046273 | 8/2000 |
| WO | 0060002 | 10/2000 |
| WO | 03041831 A2 | 5/2003 |

OTHER PUBLICATIONS

Written Opinion for International Application No. PCT/US2016/061822, International Filing Date Nov. 14, 2016, dated Jan. 24, 2017, 8 pages.

METHOD FOR ISOLATING A PHENYLENE ETHER OLIGOMER COMPOSITION AND PHENYLENE ETHER OLIGOMER COMPOSITION

CROSS-REFERENCE TO RELATED APPLICATIONS

This application is a National Stage application of PCT/US2016/061822, filed Nov. 14, 2016, which claims the benefit of U.S. Provisional Application No. 62/268,229, filed Dec. 16, 2015, both of which are incorporated by reference herein in their entirety.

BACKGROUND OF THE INVENTION

Poly(phenylene ether)s are commercially attractive materials because of their unique combination of physical, chemical, and electrical properties. Furthermore, the combination of poly(phenylene ether)s with other polymers or additives provides blends which result in improved overall properties including chemical resistance, high strength, and high flow. As new commercial application are explored for phenylene ether-containing materials, a wider range of intrinsic viscosity materials, particularly lower intrinsic viscosity materials, are desired.

The processes most generally used to produce poly(phenylene ether)s involve the self-condensation of at least one monovalent phenol in the presence of an oxygen containing gas and a catalyst comprising a metal amine complex to produce resins typically within the intrinsic viscosity range of 0.35 to 0.65 deciliter per gram as measured in chloroform at 25° C. These processes are typically carried out in the presence of an organic solvent and the reaction is usually terminated by removal of the catalyst from the reaction mixture. The catalyst metal, after being converted into a soluble metal complex with the aid of a chelating agent, is removed from the polymer solution with standard extraction techniques, such as liquid-liquid extraction.

Various techniques of isolating poly(phenylene ether)s from solution have been described. Some poly(phenylene ether)s have been isolated from solution by precipitation in an antisolvent, such as methanol. However, such precipitation methods often produce poor yields of poly(phenylene ether)s with low molecular weight and/or high relative concentrations of phenolic hydroxy groups. Some poly(phenylene ether)s have been isolated by a so-called devolatilizing extrusion process in which heat and reduced pressure in an extruder are used to drive off solvent. See, for example, U.S. Pat. Nos. 6,211,327 B1 and 6,307,010 to Braat et al. However, some poly(phenylene ether)s undergo thermal and/or oxidative degradation in these devolatilizing extrusion processes. Furthermore, evaporation of solvents is diffusion-limited and the desired melt thickness is not readily obtainable. It is therefore difficult to achieve low levels of residual solvent in the final product.

Other evaporative techniques, including wiped film evaporation (WFE) technology, have also been evaluated for poly(phenylene ether)s. WFE typically faces problems including undesired foaming, entrainment, and inconsistent solvent devolatilization. WFE techniques are also not generally suitable for isolating phenylene ether oligomers. In a wiped film evaporator, there is physical contact between the rotating blades of the evaporator and the surface of the evaporator. Thus, WFE is generally preferred for processing low viscosity solutions (e.g., solutions having a viscosity of less than 10,000 centipoise), as shown in FIG. 1, where shaded region B indicates the preferred melt viscosity ranges for various phenylene ether materials. The rotating blades of the WFE are continually wiping the material from the surface of the WFE, precluding the formation of a uniform film coating the interior of the WFE cylinder. Furthermore, the inherent risk associated with the presence or formation of solid particles during the poly(phenylene ether) isolation procedure requires that the edges of the WFE, rotor blades be cushioned with hinges. The presence of additional moving parts translates to higher wear on the equipment, which can be costly and lead to excessive down time. Additionally, agitator blades of a WFE require cushioning with carbon bushings, the presence of which can lead to feed retention. The degradation of retained material combined with wear of the carbon bushing can lead to formation of high levels of black specks which can contaminate the desired phenylene ether product.

There remains a need for an improved process for the isolation of a phenylene ether oligomer that overcomes the above-described limitations of known processes. Such a process would desirably provide a phenylene ether oligomer composition that meets various property specifications, specifically related to residual solvent levels, intrinsic viscosity, and black speck contamination. Additionally, a preferred process would further allow for tuning of the amount of amine content present in the phenylene ether oligomer composition.

BRIEF SUMMARY OF EMBODIMENTS OF THE INVENTION

One embodiment is a method for isolating a phenylene ether oligomer composition, the method comprising, feeding a solution comprising a solvent and a phenylene ether oligomer into a thin film evaporator comprising a cylindrical heating chamber and a rotor comprising one or more rotor blades, wherein an edge of the one or more rotor blades and an interior surface of the cylindrical heating chamber are separated by a distance of 0.5 to 3.5 millimeters; forming a film comprising the phenylene ether oligomer and the solvent on the interior surface of the cylindrical heating chamber; and heating the cylindrical heating chamber to devolatilize the solvent from the film to provide a phenylene ether oligomer composition having an intrinsic viscosity of 0.03 to 0.13 deciliter per gram and comprising: a phenylene ether oligomer having an external amine content of less than 1.5 weight percent; and a residual solvent in an amount of 0 to 10,000 parts per million by weight (ppm), based on the weight of the phenylene ether oligomer composition.

Another embodiment is a phenylene ether oligomer composition comprising, a phenylene ether oligomer having an external amine content of less than or equal to 1.5 weight percent; and a residual solvent in an amount of 10 to 10000 parts per million by weight, based on the weight of the phenylene ether oligomer composition; wherein the phenylene ether oligomer composition has an intrinsic viscosity of 0.03 to 0.13 deciliter per gram; a glass transition temperature of 135 to 175° C.; and a solution comprising the phenylene ether oligomer composition has a yellowness index of 20 to 45.

These and other embodiments are described in detail below.

BRIEF DESCRIPTION OF THE DRAWINGS

The following figures are exemplary embodiments.

DETAILED DESCRIPTION OF THE INVENTION

Figure 1:
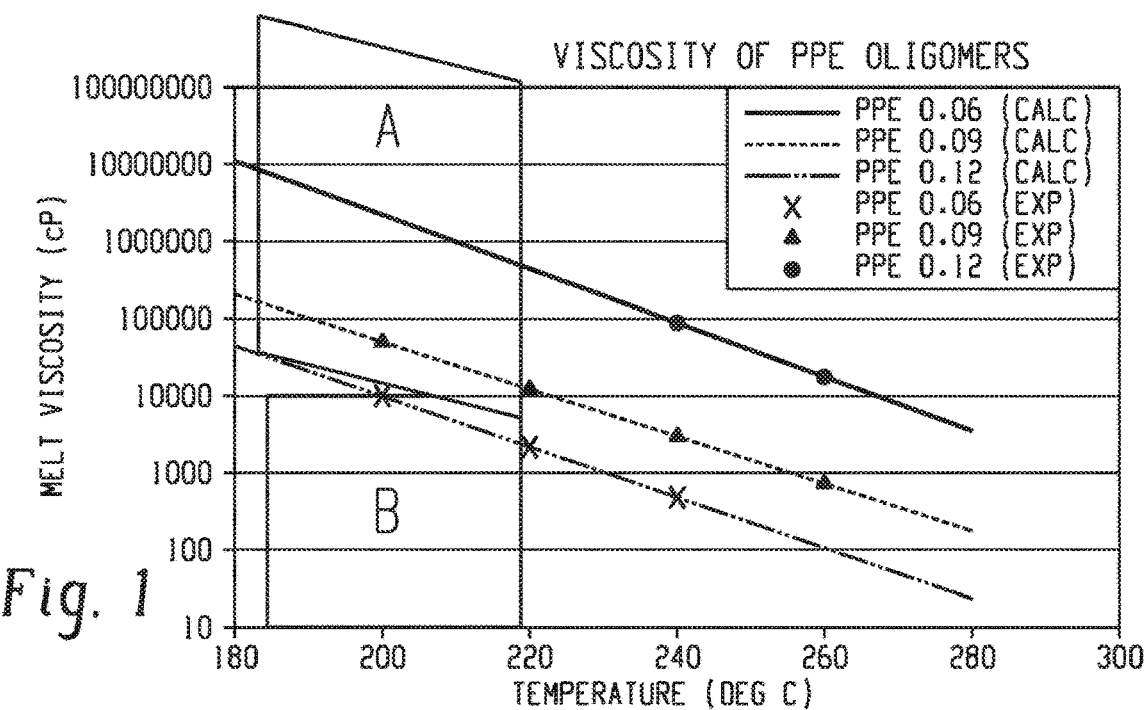
FIG. 1 shows the melt viscosity of phenylene ether oligomers at various temperatures.

The present inventors have determined phenylene ether oligomer compositions can be isolated using a thin film evaporator. Advantageously, use of the thin film evaporator can overcome the above-described limitations of previously known devolatilization techniques. Specifically, use of a thin film evaporator allows for isolation of phenylene ether oligomer compositions that meet desired property specifications, including residual solvent levels, intrinsic viscosity, and black speck contamination. Furthermore, the process described herein can allow for tuning of the amount of amine content present in the phenylene ether oligomer composition.

Accordingly, one aspect of the present disclosure is a method for isolating a phenylene ether oligomer composition. The method comprises feeding a solution comprising a solvent and a phenylene ether oligomer into a thin film evaporator. The thin film evaporator comprises a cylindrical heating chamber and a rotor comprising one or more rotor blades. In contrast to a wiped film evaporator where there is physical contact between the rotating blades of the evaporator and the surface of the evaporator, as described above, the outermost edge of the one or more rotor blades and an interior surface of the cylindrical heating chamber of the thin film evaporator of the present disclosure are separated by a fixed distance of 0.5 to 3.5 millimeters. Within this range, the edge of the one or more rotor blades and the interior surface of the cylindrical heating chamber can be separated by 0.5 to 3.0 millimeters, or 0.5 to 2.5 millimeters, or 0.5 to 2.0 millimeters, or 0.5 to 1.5 millimeters, or 0.8 to 1.2 millimeters.

The thin film evaporator can be operated using temperatures, pressures, and throughputs as described below. In some embodiments, the feed solution can comprise 30 to 40 weight percent of the phenylene ether oligomer, based on the total weight of the solution. The feed rate of the solution to the thin film evaporator can vary and can depend on the size of the thin film evaporator. In some embodiments, feeding the solution to the thin film evaporator can be at a rate of greater than 54 kilograms per hour, or greater than 54 to 120 kilograms per hour, or 63 to 120 kilograms per hour. In some embodiments, feeding the solution to the thin film evaporator is at a temperature of 40 to 80° C. In some embodiments, feeding the solution to the thin film evaporator can be at a temperature of 40 to 50° C. In some embodiments, feeding the solution to the thin film evaporator can be at a temperature of 55 to 80° C. In an embodiment, the solution comprises a phenylene ether oligomer having an intrinsic viscosity of 0.05 to 0.1 deciliter per gram at 25° C. in chloroform, and feeding the solution to the thin film evaporator is at a temperature of 40 to 50° C. In an embodiment, the solution comprises a phenylene ether oligomer having an intrinsic viscosity of greater than 0.1 to 0.15 deciliter per gram at 25° C. in chloroform, and feeding the solution to the thin film evaporator is at a temperature of 55 to 80° C. The pressure in the thin film evaporator during the method can be 26 to 53 kilopascals (200 to 400 Torr), or 26 to 47 kilopascals (200 to 350 Torr), or 26 to 40 kilopascals (200 to 300 Torr), or 29 to 51 kilopascals (220 to 380 Torr), or 32 to 48 kilopascals (240 to 360 Torr).

The method further comprises forming a film comprising the phenylene ether oligomer and the solvent on the interior surface of the cylindrical heating chamber. In some embodiments, after entering the thin film evaporator, the solution can contact the rotor of the thin film evaporator. The rotor blades can be rotating within the cylindrical heating chamber of the thin film evaporator. The rotor blades can spread the solution uniformly on the interior surface of the cylindrical heating chamber, thus forming the film. In some embodiments, the one or more rotor blades are rotating at a tip speed of 3.1 to 5.73 meters per second. In some embodiments, the tip speed of the one or more rotor blades can correspond to 400 to 740 rotations per minute. In an embodiment, the solution comprises a phenylene ether oligomer having an intrinsic viscosity of 0.05 to 0.1 deciliter per gram at 25° C. in chloroform, and the one or more rotor blades can be rotating at a speed of 5.04 to 5.42 meters per second, or 5.11 to 5.35 meters per second. In an embodiment, this tip speed can correspond to rotor speed of 650 to 700 rotations per minute, or 660 to 690 rotations per minute. In an embodiment, the solution comprises a phenylene ether oligomer having an intrinsic viscosity of greater than 0.1 to 0.15 deciliter per gram at 25° C. in chloroform, and the one or more rotor blades can be rotating at a speed of 3.49 to 4.65 meters per second, or 3.56 to 4.65 meters per second. In an embodiment, this tip speed can correspond to a rotor speed of 450 to 600 rotations per minute, or 460 to 600 rotations per minute. In some embodiments, the film can have a thickness of 0.5 to 3.5 millimeters, or 0.5 to 3.0 millimeters, or 0.5 to 2.5 millimeters, or 0.5 to 2.0 millimeters, or 0.5 to 1.5 millimeters, or 0.8 to 1.2 millimeters.

In front of each rotor blade, the solution being spread to form the film can form a bow wave, which enhances the mixing of the solution and the mass transfer. Due to the enhanced mixing that occurs in the bow wave, temperature-sensitive products can advantageously be protected from over-heating, degradation, and subsequent fouling on the interior of the thin film evaporator. In an additional advantageous feature, solution in the gap between the surface of the thin film evaporator and the rotor blade tip is highly turbulent, further leading to intensive heat and mass transfer rates, even for highly viscous materials. Accordingly, the present process allows for isolation of phenylene ether oligomers having a zero shear melt viscosity of greater than 10,000 centipoise (as illustrated in FIG. 1, where the working range for a thin film evaporator is indicated by shaded region A). In some embodiments, the zero shear melt viscosity can be greater than 10,000 to 100,000 centipoise, or 20,000 to 100,000 centipoise, or 50,000 to 100,000 centipoise, or 60,000 to 100,000 centipoise, or 75,000 to 100,000 centipoise, determined at 200° C. The zero shear melt viscosity can be determined, for example, using a Brookfield viscometer over a range of temperatures extrapolating to 200° C. and zero shear. In some embodiments, melt viscosity of the phenylene ether oligomer can be determined at the operating temperature of the thin film evaporator.

The method further comprises heating the cylindrical chamber to devolatilize the solvent from the film to provide a phenylene ether oligomer composition. In some embodiments, the thin film evaporator includes a heating jacket surrounding the cylindrical heating chamber, and heating the cylindrical chamber of the thin film evaporator can be by use of a heating medium (e.g., hot water or oil) circulating through the heating jacket. In some embodiments, heating the cylindrical chamber of the thin film evaporator is by use of hot oil, preferably at a temperature of 200 to 350° C.

In some embodiments, the method can optionally further include discharging the phenylene ether oligomer composition from the thin film evaporator. The temperature of the phenylene ether oligomer composition while being discharged from the thin film evaporator can be varied. Unexpectedly, the present inventors have determined that varying the temperature of the phenylene ether oligomer during discharging from the thin film evaporator can advantageously provide phenylene ether oligomer compositions having varied amounts of external amine groups incorporated into the phenylene ether oligomer. As used herein, the term "external amine content" refers to the weight percent of amine-containing end-groups (e.g., (alkyl)$_2$N-containing end-groups, for example, 3-methyl-4-hydroxy-5-di-n-butylaminomethylphenyl groups) incorporated into the oligomer (also referred to as Mannich end-groups), based on the total weight of the phenylene ether oligomer composition. The amine-containing end-groups can be of the formula

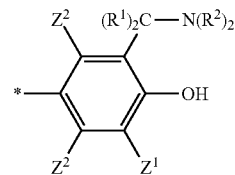

wherein $Z^1$ is halogen, unsubstituted or substituted $C_1$-$C_{12}$ hydrocarbyl provided that the hydrocarbyl group is not tertiary hydrocarbyl, hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. Each occurrence of $R^1$ is independently hydrogen or unsubstituted or substituted $C_1$-$C_{12}$ hydrocarbyl. Each occurrence of $R^2$ is independently an unsubstituted or substituted $C_1$-$C_{12}$ hydrocarbyl. In some embodiments, $Z^1$ is methyl, each occurrence of $Z^2$ is hydrogen, each occurrence of $R^1$ is hydrogen, and each occurrence of $R^2$ is n-butyl, and the amine-containing end-group is 3-methyl-4-hydroxy-5-di-n-butylaminomethylphenyl.

In some embodiments, discharging the phenylene ether oligomer from the thin film evaporator is at a temperature of 250 to 350° C., or 250 to 340° C., or 250 to 330° C., or 250 to 320° C., or 250 to 310° C., or 250 to 300° C., or 255 to 300° C., or 260 to 300° C., or 270 to 300° C. When the discharging is conducted at a temperature of 250 to 300° C., the phenylene ether oligomer composition comprises a phenylene ether oligomer having an external amine content of less than or equal to 0.1 weight percent, greater than 0 to 0.1 weight percent, or 0.01 to 0.1 weight percent, or 0.01 to 0.05 weight percent, or 0.025 to 0.05 weight percent, based on the total weight of the phenylene ether oligomer composition.

In some embodiments, discharging the phenylene ether oligomer composition from the thin film evaporator is at a temperature of less than 250° C., or 175 to less than 250° C., or 175 to 245° C., or 180 to 240° C., or 190 to 240° C., or 200 to 240° C., or 210 to 240° C., or 220 to 240° C., or 230 to 240° C. When the discharging is conducted at a temperature of less than 250° C., the phenylene ether oligomer composition comprises a phenylene ether oligomer having an external amine content of 0.1 to 1.5 weight percent, or 0.1 to 1.4 weight percent, or 0.2 to 1.3 weight percent, or 0.5 to 1.25 weight percent, based on the total weight of the phenylene ether oligomer composition.

In some embodiments, the method further comprises cooling the discharged phenylene ether oligomer composition. Preferably, the discharged phenylene ether oligomer composition is cooled with a cooling device comprising a cooling belt. In some embodiments, the cooling device is maintained at a temperature of −30 to 150° C., or 0 to 80° C., or 25 to 50° C. It will be understood that the temperature of the cooling device can momentarily rise above the specified temperature when it contacts the discharged composition. In some embodiments, the cooling device is capable of cooling the discharged composition to a temperature of 20° C. to the glass transition temperature of the poly(phenylene ether). Suitable cooling belts include the steel cooling belts commercially available from Sandvik Process Systems LLC, Totowa, N.J. Cooling belts can, optionally, be cooled with air or a liquid such as water, glycol, liquid brine, and mixture thereof. Such cooling fluids are typically circulated in a way that they contact a face of the cooling belt opposite the face contacted by the discharged composition. In other words, the cooling fluid does not typically contact the discharged composition. In some embodiments, the cooling device comprises a means of spraying the extruded composition with a water mist.

In an embodiment, the method for isolating the phenylene ether oligomer comprises feeding a solution comprising toluene and a phenylene ether oligomer having an intrinsic viscosity of 0.075 to 0.095 deciliter per gram into the thin film evaporator. Feeding the solution can be at a temperature of 55 to 80° C. The one or more rotor blades and the interior surface of the cylindrical heating chamber are separated by a distance of 0.8 to 1.2 millimeters, and the rotor blades are rotating at a tip speed of 3.1 to 5.73 meters per second.

In another embodiment, the method for isolating the phenylene ether oligomer comprises feeding a solution comprising toluene and a phenylene ether oligomer having an intrinsic viscosity of 0.12 to 0.13 deciliter per gram into the thin film evaporator. Feeding the solution can be at a temperature of 40 to 50° C. The one or more rotor blades and the interior surface of the cylindrical heating chamber are separated by a distance of 0.8 to 1.2 millimeters, and the rotor blades are rotating at a tip speed of 3.1 to 5.73 meters per second.

Another aspect of the present disclosure is a phenylene ether oligomer composition. The phenylene ether oligomer composition comprises a phenylene ether oligomer and a residual solvent.

The phenylene ether oligomer is the product of oligomerization of a monohydric phenol (e.g., 2,6-xylenol, 2,3,6-xylenol, or combinations thereof). Specifically, the phenylene ether oligomer can be prepared in solution by oxidative coupling of at least one monohydric phenol in the presence of a catalyst system. Suitable catalyst systems can contain one or more heavy metal compounds including copper, manganese, or cobalt, usually in combination with various other materials such as a secondary amine, tertiary amine, halide or combination of two or more of the foregoing. In some embodiments, the phenylene ether oligomer comprises phenylene ether repeating units having the structure

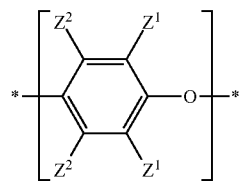

wherein for each repeating unit, each $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atom. In some embodiments, the poly(phenylene ether) block comprises 2,6-dimethyl-1,4-phenylene ether repeating units, that is, repeating units having the structure

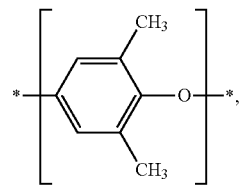

2,3,6-trimethyl-1,4-phenylene ether repeating units, or a combination thereof.

The phenylene ether oligomer can be a homopolymer, a copolymer, a graft copolymer, an ionomer, a block copolymer, or a combination thereof. The phenylene ether oligomer can comprise, for example 2,6-dimethyl-1,4-phenylene ether repeating units, 2,3,6-trimethyl-1,4-phenylene ether repeating units, or a combination thereof. The phenylene ether oligomer can be monofunctional or bifunctional. In some embodiments, the phenylene ether oligomer can be monofunctional. For example, it can have a functional group at one terminus of the polymer chains. The functional group can be, for example, a hydroxyl group or a (meth)acrylate group, preferably a hydroxyl group. In some embodiments, the phenylene ether oligomer comprises poly(2,6-dimethyl-1,4-phenylene ether). An example of a monofunctional poly(2,6-dimethyl-1,4-phenylene ether) oligomer is NORYL™ Resin SA120, available from SABIC Innovative Plastics.

In some embodiment, the phenylene ether oligomer can be bifunctional. For example, it can have functional groups at both termini of the oligomer chain. The functional groups can be, for example, hydroxyl groups or (meth)acrylate groups, preferably hydroxyl groups. Bifunctional polymers with functional groups at both termini of the polymer chains are also referred to as "telechelic" polymers. In some embodiments, the phenylene ether oligomer comprises a bifunctional phenylene ether oligomer having the structure

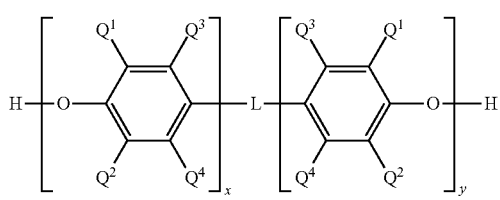

wherein $Q^1$ and $Q^2$ are each independently selected from the group consisting of halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; each occurrence of $Q^3$ and $Q^4$ is independently selected from the group consisting of hydrogen, halogen, unsubstituted or substituted $C_1$-$C_{12}$ primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; x and y are independently 0 to 30, specifically 0 to 20, more specifically 0 to 15, still more specifically 0 to 10, even more specifically 0 to 8, provided that the sum of x and y is at least 2, specifically at least 3, more specifically at least 4; and L has the structure

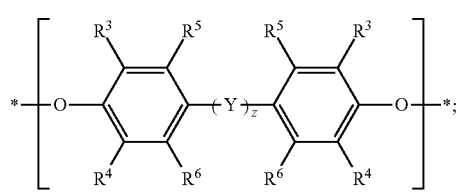

wherein each occurrence of $R^3$ and $R^4$ and $R^5$ and $R^6$ is independently selected from the group consisting of hydrogen, halogen, unsubstituted or substituted $C_1$-$C_{12}$, primary or secondary hydrocarbyl, $C_1$-$C_{12}$ hydrocarbylthio, $C_1$-$C_{12}$ hydrocarbyloxy, and $C_2$-$C_{12}$ halohydrocarbyloxy wherein at least two carbon atoms separate the halogen and oxygen atoms; z is 0 or 1; and Y has a structure selected from the group consisting of

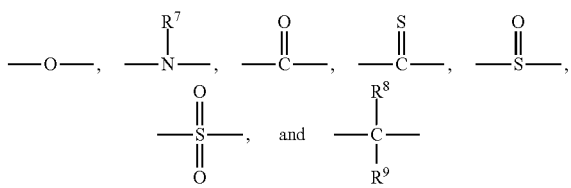

wherein each occurrence of $R^7$ is independently selected from the group consisting of hydrogen and $C_1$-$C_{12}$, hydrocarbyl, and each occurrence of $R^8$ and $R^9$ is independently selected from the group consisting of hydrogen, $C_1$-$C_{12}$, hydrocarbyl, and $C_1$-$C_6$ hydrocarbylene wherein $R^8$ and $R^9$ collectively form a $C_1$-$C_{12}$, alkylene group.

In the hydroxy-terminated phenylene ether structure above, there are limitations on the variables x and y, which correspond to the number of phenylene ether repeating units at two different places in the bifunctional phenylene ether oligomer. In the structure, x and y are independently 0 to 30, specifically 0 to 20, more specifically 0 to 15, even more specifically 0 to 10, yet more specifically 0 to 8. The sum of x and y is at least 2, specifically at least 3, more specifically at least 4. A phenylene ether oligomer can be analyzed by proton nuclear magnetic resonance spectroscopy ($^1$H NMR) to determine whether these limitations are met, on average. Specifically, $^1$H NMR can distinguish between protons associated with internal and terminal phenylene ether groups, with internal and terminal residues of a polyhydric phenol, and with terminal residues as well. It is therefore possible to determine the average number of phenylene ether repeating units per molecule, and the relative abundance of internal and terminal residues derived from dihydric phenol.

In some embodiments the phenylene ether oligomer comprises a bifunctional phenylene ether oligomer having the structure

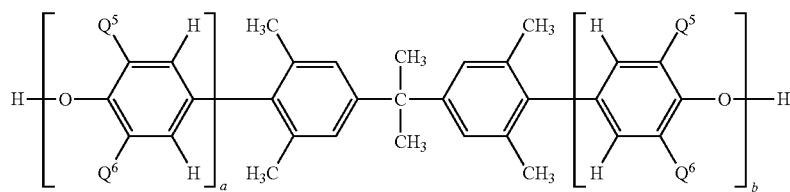

wherein each occurrence of $Q^5$ and $Q^6$ is independently methyl, di-n-butylaminomethyl, or morpholinomethyl; and each occurrence of a and b is independently 0 to 20, with the proviso that the sum of a and b is at least 2. An exemplary bifunctional phenylene ether oligomer includes NORYL™ Resin SA90, available from SABIC Innovative Plastics.

The phenylene ether oligomer can comprise rearrangement products, such as bridging products and branching products. For example, poly(2,6-dimethyl-1,4-phenylene ether) can comprise the bridging fragment below:

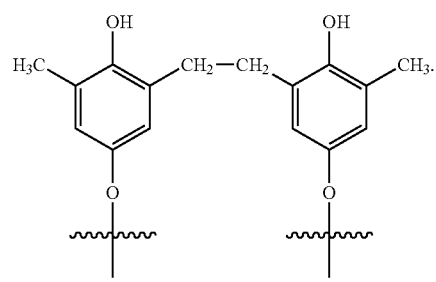 [SMILES: *Oc1cc(C)c(O)c(CCc2cc(O*)cc(C)c2O)c1]

This branching fragment is referred to herein as an "ethylene bridge group". As another example, poly(2,6-dimethyl-1,4-phenylene ether) can comprise the branching fragment below:

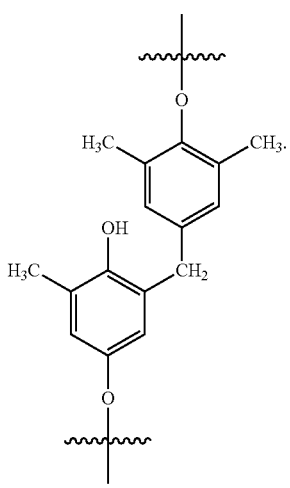 [SMILES: *Oc1cc(C)c(O)c(Cc2cc(C)c(O*)c(C)c2)c1]

This branching fragment is referred to herein as a "rearranged backbone group". These fragments can be identified and quantified by $^{31}$P nuclear magnetic resonance spectroscopy after phosphorus derivatization of the hydroxyl groups.

The phenylene ether oligomer can be essentially free of incorporated diphenoquinone residues. In the context, "essentially free" means that the fewer than 1 weight percent of phenylene ether oligomer molecules comprise the residue of a diphenoquinone. As described in U.S. Pat. No. 3,306,874 to Hay, synthesis of poly(phenylene ether) by oxidative polymerization of monohydric phenol yields not only the desired poly(phenylene ether) but also a diphenoquinone as side product. For example, when the monohydric phenol is 2,6-dimethylphenol, 3,3',5,5'-tetramethyldiphenoquinone is generated. Typically, the diphenoquinone is "reequilibrated" into the poly(phenylene ether) (i.e., the diphenoquinone is incorporated into the poly(phenylene ether) chain) by heating the polymerization reaction mixture to yield a poly (phenylene ether) comprising terminal or internal diphenoquinone residues. For example, as shown in the Scheme below, when a poly(phenylene ether) is prepared by oxidative polymerization of 2,6-dimethylphenol to yield poly(2,6-dimethyl-1,4-phenylene ether) and 3,3',5,5'-tetramethyldiphenoquinone, reequilibration of the reaction mixture can produce a poly(phenylene ether) with terminal and internal residues of diphenoquinone. Thus, the Scheme below illustrates one method for the preparation of a difunctional phenylene ether oligomer.

Scheme

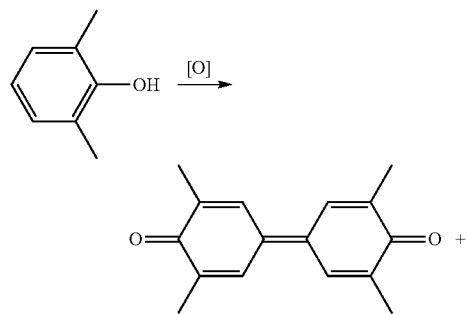

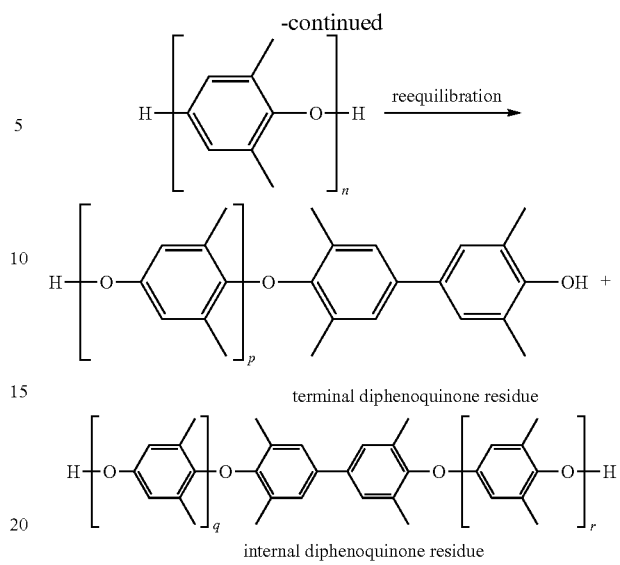

terminal diphenoquinone residue internal diphenoquinone residue

The phenylene ether oligomer can have a number average molecular weight of 500 to 7,000 grams per mole, and a weight average molecular weight of 500 to 15,000 grams per mole, as determined by gel permeation chromatography using polystyrene standards. In some embodiments, the number average molecular weight can be 750 to 4,000 grams per mole, and the weight average molecular weight can be 1,500 to 9,000 grams per mole, as determined by gel permeation chromatography using polystyrene standards.

As mentioned above, the phenylene ether oligomer can include molecules having aminoalkyl-containing endgroups (also referred to herein as external amine content), typically located in a position ortho to the hydroxy group. The phenylene ether oligomer of the phenylene ether oligomer composition can have an external amine content of less than or equal to 1.5 weight percent, or greater than 0 to 1.5 weight percent, or 0.01 to 1.5 weight percent, or 0.01 to 1 weight percent, or 0.01 to 0.75 weight percent, or 0.01 to 0.5 weight percent, or 0.01 to 0.1 weight percent, or 0.025 to 1.5 weight percent, or 0.025 to 1 weight percent, or 0.025 to 0.75 weight percent, or 0.025 to 0.5 weight percent, or 0.025 to 0.1 weight percent, based on the total weight of the phenylene ether oligomer composition. In some embodiments, the phenylene ether oligomer can have an external amine content of less than or equal to 0.1 weight percent, or greater than 0 to 0.1 weight percent, or 0.01 to 0.08 weight percent, or 0.01 to 0.05 weight percent, or 0.025 to 0.08 weight percent, or 0.025 to 0.05 weight percent. In some embodiments, the phenylene ether oligomer can have an external amine content of 0.1 to 1.5 weight percent, or 0.1 to 1.4 weight percent, or 0.2 to 1.3 weight percent, or 0.5 to 1.25 weight percent. In some embodiments, the phenylene ether oligomer can be substantially free of external amine content, where "substantially free" means that no external amine content can be detected by proton nuclear magnetic resonance ($^1$H NMR) spectroscopy. In some embodiments, "substantially free" means that the phenylene ether oligomer does not comprise more than 0.025 weight percent, preferably not more than 0.01 weight percent external amine.

In addition to the phenylene ether oligomer, the phenylene ether oligomer composition further includes a residual solvent. The residual solvent can be an organic solvent for example aliphatic, cyclic, and aromatic hydrocarbons, including heterocyclic compounds, heteroaryl compounds and halosubstituted aliphatic, cyclic and aromatic hydrocarbons up to per-halo, as well as aliphatic, cyclic and aromatic aldehydes, alcohols, ethers and ketones, and halo substituted derivatives thereof. More specific examples include carbon tetraflouride, pyridine, trichloromethane, dichloromethane, methyl ethyl ketone, methylbutyl ketone, diethylether, diethylene glycol, dimethyl ketone, benzene, toluene, xylene, resorcinol, hydroquinone, tetrahydrofuran, methylene chloride, 1,1,2,2-tetrachloroethane, 1,2-dichloroethylene, chlorobenzene, chloroform, dichlorobenzene and 1,1,2-trichloroethane, and the like, or combinations thereof. In some embodiments, the residual solvent comprises the solvent in which the phenylene ether oligomer was prepared. In some embodiments, the residual solvent comprises toluene, chloroform, methyl ethyl ketone, or a combination thereof.

The residual solvent can be present in an amount of 10 to 10000 parts per million by weight (ppm), based on the weight of the phenylene ether oligomer composition. In some embodiments, the residual solvent is present in an amount of 10 to 7000 ppm, or 20 to 5000 ppm, or 50 to 4000 ppm, or 50 to 3000 ppm, or 50 to 2000 ppm, or 50 to 1000 ppm, or 50 to 600 ppm, or 50 to 500 ppm, or 50 to 150 ppm, based on the weight of the phenylene ether oligomer composition.

The phenylene ether oligomer composition can have a number of desirable properties. The phenylene ether oligomer composition can have an intrinsic viscosity of 0.03 to 0.13 deciliter per gram, or 0.06 to 0.13 deciliter per gram, or 0.08 to 0.129 deciliter per gram. Intrinsic viscosity can be measured by Ubbelohde viscometer at 25° C. in chloroform.

Yellowness index is a value calculated from spectrophotometric data that describes the color of a test sample as being clear or white (i.e., having low yellowness index) versus being more yellow (i.e., high yellowness index). Sample handling and preparation can affect the test results. Yellowness index of the phenylene ether oligomer composition by dissolving 5 grams of phenylene ether oligomer composition in 45.3 milliliters of toluene, and measuring the yellowness index of the resulting solution, for example on a Perkin Elmer UV/Vis Lambda 25 Spectrometer. In some embodiments, a solution comprising the phenylene ether oligomer composition exhibits a yellowness index of 20 to 50. Within this range, the phenylene ether oligomer composition can exhibit a yellowness index of 20 to 45, or 23 to 43, or 26 to 43, or 23 to 34, or 20 to 30.

In some embodiments, the phenylene ether oligomer composition can advantageously exhibit a reduced number of black specks. Black specks are dark or colored particulates that a visible to the human eye without magnification, and having an average diameter of 40 micrometers or greater. In some embodiments, the phenylene ether oligomer compositions can be substantially free of black specks. "Substantially free" of black specks means that a Size 11 Grade 44 Ashless Whatman filter paper retains fewer than 5 black specks after filtering a 20 weight percent solution comprising the phenylene ether oligomer composition as determined by visual inspection with the unaided eye. The solution can be, for example, a 20 weight percent solution of the phenylene ether oligomer composition in toluene.

In a specific embodiment, a phenylene ether oligomer composition comprises a phenylene ether oligomer having an external amine content of less than or equal to 1.5 weight percent, or 0.01 to 1.5 weight percent, or 0.1 to 1 weight percent, or 0.01 to 0.75 weight percent, or 0.01 to 0.5 weight percent, or 0.01 to 0.1 weight percent, or 0.025 to 1.5 weight percent, or 0.025 to 1 weight percent, or 0.025 to 0.75 weight percent, or 0.025 to 0.5 weight percent, based on the total weight of the phenylene ether oligomer composition, and a residual solvent in an amount of 10 to 10000 ppm, or 10 to 7000 ppm, or 20 to 5000 ppm, or 50 to 4000 ppm, or 50 to 3000 ppm, or 50 to 2000 ppm, or 50 to 1000 ppm, or 50 to 600 ppm, or 50 to 500 ppm, or 50 to 150 ppm, based on the weight of the phenylene ether oligomer composition. The phenylene ether oligomer composition has an intrinsic viscosity of 0.03 to 0.13 deciliter per gram, a glass transition temperature of 135 to 175° C., and a solution comprising the phenylene ether oligomer composition has a yellowness index of 20 to 45.

In some embodiments, the phenylene ether oligomer composition can comprise a phenylene ether oligomer having an external amine content of less than or equal to 1.3 weight percent, or 0.01 to 1.3 weight percent, or 0.01 to 1 weight percent, or 0.01 to 0.75 weight percent, or 0.025 to 1.3 weight percent, or 0.025 to 1 weight percent, or 0.025 to 0.75 weight percent, and a residual solvent present in an amount of 10 to 10000 ppm, or 20 to 5000 ppm, or 50 to 4000 ppm, or 100 to 3000 ppm, or 200 to 2500 ppm, or 300 to 1000 ppm, or 400 to 1000 ppm, or 500 to 950 ppm, based on the weight of the phenylene ether oligomer composition. The phenylene ether composition has an intrinsic viscosity of 0.075 to 0.095 deciliter per gram, a glass transition temperature of 135 to 150° C., or 140 to 150° C. as determined by differential scanning calorimetry, and a solution comprising the phenylene ether oligomer composition has a yellowness index of 25 to 45.

In some embodiments, the phenylene ether oligomer composition can comprise a phenylene ether oligomer having an external amine content of 0.01 to 0.1 weight percent, or 0.01 to 0.08 weight percent, or 0.01 to 0.05 weight percent, or 0.025 to 0.08 weight percent, or 0.025 to 0.05 weight percent, and a residual solvent present in an amount of 10 to 6500 ppm, or 20 to 5000 ppm, or 50 to 4000 ppm, or 50 to 3000 ppm, or 50 to 2000 ppm, or 50 to 1000 ppm, or 50 to 600 ppm, or 50 to 500 ppm, or 50 to 150 ppm, based on the weight of the phenylene ether oligomer composition. The phenylene ether composition has an intrinsic viscosity of 0.125 to 0.13 deciliter per gram, a glass transition temperature of 150 to 175° C., or 165 to 175° C. as determined by differential scanning calorimetry, and a solution comprising the phenylene ether oligomer composition has a yellowness index of 20 to 35, or 30 to 35.

The phenylene ether oligomer composition can be isolated by the above-described method. In an embodiment, the method for isolating the phenylene ether oligomer comprises feeding a solution comprising toluene and a phenylene ether oligomer having an intrinsic viscosity of 0.075 to 0.095 deciliter per gram into the thin film evaporator. Feeding the solution can be at a temperature of 55 to 80° C. The one or more rotor blades and the interior surface of the cylindrical heating chamber are separated by a distance of 0.8 to 1.2 millimeters, and the rotor blades are rotating at a tip speed of 3.1 to 5.73 meters per second. The method further comprises forming a film comprising the phenylene ether oligomer and the solvent on the interior surface of the cylindrical heating chamber, and heating the cylindrical heating chamber to devolatilize the solvent from the film to provide the phenylene ether oligomer composition. The resulting phenylene ether oligomer composition comprises a phenylene ether oligomer having an external amine content of 0.01 to 1.3 weight percent, or 0.01 to 1 weight percent, or 0.01 to 0.1 weight percent, or 0.025 to 1.3 weight percent, or 0.025 to 1 weight percent, or 0.025 to 0.1 weight percent based on the weight of the phenylene ether oligomer composition, and a residual toluene content of 10 to 10000 ppm, or 10 to 7000 ppm, or 20 to 5000 ppm, or 50 to 4000 ppm, or 100 to 3000 ppm, or 200 to 2500 ppm, or 300 to 1000 ppm, or 400 to 1000 ppm, or 500 to 950 ppm. The phenylene ether oligomer composition can have an intrinsic viscosity of 0.075 to 0.095 deciliter per gram, a glass transition temperature (Tg) of 135 to 150° C., or 140 to 150° C., as determined by differential scanning calorimetry (DSC), and a solution comprising the phenylene ether oligomer composition has a yellowness index of 25 to 45.

In another embodiment, the method for isolating the phenylene ether oligomer comprises feeding a solution comprising toluene and a phenylene ether oligomer having an intrinsic viscosity of 0.12 to 0.13 deciliter per gram into the thin film evaporator. Feeding the solution can be at a temperature of 40 to 50° C. The one or more rotor blades and the interior surface of the cylindrical heating chamber are separated by a distance of 0.8 to 1.2 millimeters, and the rotor blades are rotating at a tip speed of 3.1 to 5.73 meters per second. The method further comprises forming a film comprising the phenylene ether oligomer and the solvent on the interior surface of the cylindrical heating chamber, and heating the cylindrical heating chamber to devolatilize the solvent from the film to provide the phenylene ether oligomer composition. The resulting phenylene ether oligomer composition comprises a phenylene ether oligomer having an external amine content of greater than 0.01 to 0.1 weight percent, based on the weight of the phenylene ether oligomer composition, and a residual toluene content of 10 to 6500 ppm, or 20 to 5000 ppm, or 50 to 4000 ppm, or 50 to 3000 ppm, or 50 to 2000 ppm, or 50 to 1000 ppm, or 50 to 600 ppm, or 50 to 500 ppm, or 50 to 150 ppm. The phenylene ether oligomer composition can have an intrinsic viscosity of 0.125 to 0.13 deciliter per gram, a glass transition temperature (Tg) of 150 to 175° C., or 165 to 175° C., as determined by differential scanning calorimetry (DSC), and a solution comprising the phenylene ether oligomer composition has a yellowness index of 20 to 35, or 30 to 35.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Materials used for the following Examples are described in Table 1.

TABLE 1

| Component | Description |
| --- | --- |
| PPE 0.09 | A phenylene ether oligomer comprising repeating units derived from 2,6-dimethylphenol and a single unit of tetramethylbisphenol A, having an intrinsic viscosity of 0.09 deciliter per gram and a number average molecular weight of 1,600 grams/mole. Available as NORYL ™ Resin SA90 from SABIC. |

TABLE 1-continued

| Component | Description |
| --- | --- |
| PPE 0.12 | A phenylene ether oligomer comprising repeating units derived from 2,6- dimethylphenol, having an intrinsic viscosity of 0.12 deciliter per gram and a number average molecular weight of 2,350 grams/mole. Available as NORYL ™ Resin SA120 from SABIC. |

Solutions comprising 30 weight percent phenylene ether oligomer and 70 weight percent toluene were prepared, and held at 40 to 50° C. for the PPE 0.09 oligomers, and 60 to 70° C. for the PPE 0.12 oligomers in a jacketed 946 liter (250 gallon) mix tank.

A thin film evaporator (TFE) with a 0.50 square meter (5.4 square foot) thermal surface area, heated with hot oil to a temperature of 330° C., and having a 14.9 kilowatt (20 horsepower) hydraulic drive up to 750 rotations per minute was used for the following Examples. The TFE, included a rotor of a medium viscosity design with alternating straight (segmented) and transport (segmented) blades and a greased needle bearing with a two spoke spider for pin-up design, allowing for additional free flow area.

The above-described feed solutions comprising the phenylene ether oligomers were metered from the mix tank using a centrifugal pump with a control valve and a mass flow meter. The feed solution entered the TFE and was agitated by the rotor as it flowed down the interior surface of the TFE. The clearance between the rotor and the interior surface of the TFE was about 1 millimeter. Vapor generated in the thermal area of the TFE traveled countercurrent to the liquid through the open recesses between the rotor and the wall of the TFE. The vapor was condensed on the tube side of two shell and tube heat exchangers arranged in series, each cooled with cooling water. Vacuum was pulled from the bottom of the second condenser. The vacuum was automatically controlled by a steam bleed with an automated needle valve. Distillate from the condensers was transferred to a 208 liter (55 gallon) drum every six minutes.

The concentrated phenylene ether oligomer composition was discharged from the bottom nozzle of the evaporator by a gear pump. The molten concentrated composition was solidified on a chilled belt. The cooling belt was a Sandvik single-belt cooling conveyor. The belt had a width of 30.5 centimeters (12 inches) and a total (loop) length of 4.1 meters (167 inches) that included an actively cooled length of 95.3 centimeters (37.5 inches). Evaporated phenylene ether oligomer composition traveled a distance of about 1.6 meters (62 inches) on the cooling belt. Cooling was provided by a water spray beneath the belt. The cooling water was circulated at a rate of about 11-15 liters per minute (about 3-4 gallons per minute) and a pressure of about 140-170 kilopascals (about 20-25 pounds per square inch gauge). The speed range for the belt is about 0.5 to 20 meters per minute. The belt transport rate in these experiments was about 10 meters per minute (33 feet per minute). The cooling belt was maintained at about 25-30° C. At the end of the cooling belt, the cooled phenylene ether oligomer composition, which was in the form of broken strand fragments of variable length, was transferred to a bag. Although the phenylene ether oligomer composition here was in the form of broken strand fragments, it could also have been formed into prills or pellets or pastilles or powders or granules by use of apparatuses and methods known in the art. Samples were taken for quality analysis of the isolated product.

Intrinsic viscosity of the phenylene ether oligomer composition was measured by Ubbelohde viscometer at 25° C. in chloroform.

Residual solvent amount in the phenylene ether oligomer compositions was determined by gas chromatography.

External amine content in the phenylene ether oligomer compositions was determined by proton nuclear magnetic resonance CH NMR) spectroscopy. External amine content is reported in weight percent, and specifically refers to the weight percent of 3-methyl-4-hydroxy-5-di-n-butylaminomethylphenyl groups incorporated into the oligomer.

Yellowness index of the phenylene ether oligomer compositions was determined by dissolving 5 grams of phenylene ether oligomer composition in 45.3 milliliters of toluene, and measuring the yellowness index of the resulting solution, for example on a Perkin Elmer UV/Vis Lambda 25 Spectrometer, by determining solution absorption at 445, 555, and 600 nanometers.

Black specks were measured by counting the black specks present visually (with the unaided eye) retained on a Size 11 Grade 44 Ashless Whatman filter paper after filtering a 20 weight percent solution comprising the phenylene ether oligomer and toluene through the filter paper. Samples were considered to free of black specks if fewer than 5 black specks were observed on the filter paper.

The upper control limit ("UCL") and the lower control limit ("LCL") for intrinsic viscosity, residual solvent, and yellowness index are shown in the relevant Figures, described below.

Comparative Example 1

For Comparative Example 1, a 30% solution of PPE 0.09 oligomer and toluene was fed to a flash tank where it was concentrated to 70% PPE 0.09 oligomer and 30% toluene. A devolatilization extruder was subsequently used to evaporate the remaining toluene and provide a PPE 0.09 oligomer melt composition having less than 9000 ppm toluene.

Examples 1-4

For Examples 1A and 1B, a 30% solution of PPE 0.09 oligomer and toluene as described above was fed to the TFE. The vacuum was maintained at 240 to 260 Torr and the rotor speed was maintained at 660 to 685 rotations per minute so that the rotor tip speed was held constant at 5.1 to 5.3 meters per second. The oligomer solution was fed to the TFE at a rate of 111 to 116 kilograms per hour (245 to 255 pounds per hour). The TFE was operated to discharge a molten concentrated PPE 0.09 composition at a temperature of 204 to 210° C. Under these conditions, the external amine content (i.e., weight percent of 3-methyl-4-hydroxy-5-di-n-butylaminomethylphenyl groups incorporated into the oligomer, also referred to as external Mannich amine groups) were 1.25 to 1.3 weight percent, based on the weight of the oligomer composition. The final residual toluene concentration was 8400 to 8900 parts per million by weight (ppm). The phenylene ether oligomer composition was substantially free of black specks.

For Examples 2A and 2B, a 30% solution of PPE 0.09 oligomer and toluene as described above was fed to the TFE as in Example 1, except that the PPE 0.09 oligomer solution was fed to the TFE at a rate of 68.4 to 69.9 kilograms per hour (151 to 154 pounds per hour) and the TFE was operated to discharge the molten concentrated PPE 0.09 composition at a temperature of 222 to 224° C. All other parameters were as in Example 1. Under these conditions the external amine content was 0.68 to 0.69 weight percent, and the final residual toluene concentration was 900 to 2300 ppm. The phenylene ether oligomer composition was substantially free of black specks.

For Examples 3A and 3B, a 30% solution of PPE 0.09 oligomer and toluene as described above was fed to the TFE as in Example 1, except that the PPE 0.09 oligomer solution was fed to the TFE at a rate of 106 to 112 kilograms per hour (234 to 247 pounds per hour), and the TFE was operated to discharge the molten concentrated PPE 0.09 composition at a temperature of 274° C. All other parameters were as in Example 1. Under these conditions the external amine level was non-detectable by $^1$H NMR spectroscopy, and the final residual toluene concentration was 650 to 820 ppm. The phenylene ether oligomer composition was substantially free of black specks.

For Examples 4A, 4B, and 4C, a 30% solution of PPE 0.09 oligomer and toluene as described above was fed to the TFE as in Example 1, except that the PPE 0.09 oligomer solution was fed to the TFE at a rate of 63.5 to 68 kilograms per hour (140 to 150 pounds per hour), and the TFE was operated to discharge the molten concentrated PPE 0.09 composition at a temperature of 255 to 264° C. All other parameters were as in Example 1. Under these conditions the external amine level was non-detectable to 0.01 weight percent, and the final residual toluene concentration was 530 to 580 ppm. The phenylene ether oligomer composition was substantially free of black specks.

The various process conditions of each of the above methods and the properties of the isolated phenylene ether oligomer compositions are summarized in Table 2. Number average molecular weight (Mn), weight average molecular weight (Mw), and dispersity (D) were determined using gel permeation chromatography (GPC) against polystyrene standards, eluting with chloroform as the mobile phase. The columns used in the GPC analysis were 1,000 and 10,000 angstrom PLgel columns with a 5 microliter 100 angstrom PLgel guard column. "External DBA" refers to the weight percent of 3-methyl-4-hydroxy-5-di-n-butylaminomethylphenyl groups incorporated into the phenylene ether oligomer composition. Glass transition temperature (Tg) was determined at half-width by differential scanning calorimetry (DSC). "TMBPA" refers to residual 2,2-bis(3,5-dimethyl-4-hydroxyphenyl)propane as determined by gas chromatography. "Xylenol" refers to residual 2,6-dimethylphenol as determined by gas chromatography.

TABLE 2

| | CE1 | E1A | E1B | E2A | E2B | E3A | E3B | E4A | E4B | E4C |
|---|---|---|---|---|---|---|---|---|---|---|
| Rates | | | | | | | | | | |
| Feed Rate (kg/hr) | | 115.2 | 110.6 | 69.8 | 68.5 | 112 | 106.1 | 66.2 | 63.5 | 68 |
| Oligomer Rate (kg/hr) | | 35.8 | 30.8 | 21.1 | 19.9 | 29.5 | 24.5 | 15.4 | 13.6 | 18.6 |

TABLE 2-continued

| | CE1 | E1A | E1B | E2A | E2B | E3A | E3B | E4A | E4B | E4C |
|---|---|---|---|---|---|---|---|---|---|---|
| Distillate Rate (kg/hr) | | 79.4 | 79.8 | 48.1 | 48.5 | 82.5 | 81.6 | 50.8 | 49.9 | 49.4 |
| Split (% OH) | | 68.9 | 72.1 | 68.8 | 70.9 | 73.7 | 76.9 | 76.7 | 78.6 | 72.7 |
| Feed Concentration (wt % PPE) | | 31 | 31 | 31 | 31 | 31 | 31 | 31 | 31 | 31 |
| Steam Sparge (kg/hr) | | 0 | 0 | 0 | 0 | 0 | 0 | 0 | 0 | 0 |
| Nitrogen Sparge (kg/hr) | | 0.45 | 0.45 | 0.45 | 0.45 | 0.45 | 0.45 | 0.45 | 0.45 | 0.45 |
| $O_2$ levels (%) | | 5.5 | 5.4 | 4.3 | 4 | 3.9 | 3.9 | 3.5 | 3.3 | 3 |
| Temperatures (° C.) | | | | | | | | | | |
| Feed | | 42 | 42 | 43 | 44 | 45 | 45 | 47 | 48 | 49 |
| Vapor | | 85 | 85 | 87 | 89 | 97 | 97 | 100 | 102 | 105 |
| Heat in | | 247 | 245 | 245 | 246 | 320 | 320 | 302 | 313 | 313 |
| Heat out | | 239 | 231 | 240 | 241 | 309 | 310 | 296 | 307 | 307 |
| TFE Discharge concentrate | | 205 | 204 | 224 | 222 | 274 | 274 | 255 | 264 | 264 |
| Bottoms Pump Discharge | | 199 | 198 | 199 | 199 | 214 | 212 | 205 | 205 | 206 |
| dT (Discharge – (Discharge-Bottoms Pump) | | 6 | 6 | 25 | 23 | 59 | 62 | 50 | 59 | 58 |
| dT (Heat out – Discharge) | | 34 | 27 | 16 | 19 | 36 | 35 | 41 | 43 | 43 |
| Condenser CTW in | | 29 | 29 | 26 | 26 | 27 | 27 | 27 | 27 | 26 |
| Condenser CTW out | | 32 | 32 | 29 | 29 | 31 | 30 | 29 | 28 | 27 |
| Distillate | | 32 | 32 | 31 | 31 | 30 | 31 | 30 | | 31 |
| Other TFE settings | | | | | | | | | | |
| Vacuum (Torr) | | 253 | 252 | 242 | 255 | 252 | 253 | 249 | 259 | 249 |
| Rotor (RPM) | | 663 | 668 | 662 | 669 | 675 | 677 | 682 | 684 | 686 |
| Hyd. Generator Amp | | 15 | 15 | 14 | 14.5 | 14 | 13.5 | 12.5 | 12 | 12 |
| Conc. Pump Setting (RPM) | | 25 | 26 | 26 | 25.5 | 25 | 25 | 25 | 25 | 25 |
| Analytical Results | | | | | | | | | | |
| Residual Toluene (ppm) | 7444 | 8395 | 8880 | 2333 | 909 | 820 | 646 | 562 | 532 | 575 |
| Intrinsic Viscosity (dl/g) | 0.081 | 0.084 | 0.084 | 0.086 | 0.086 | 0.089 | 0.089 | 0.089 | 0.089 | 0.089 |
| Mw (g/mol) | 3316 | | 3604 | | 3730 | | 3858 | | | 3838 |
| Mn (g/mol) | 1645 | | 1703 | | 1725 | | 1731 | | | 1727 |
| Đ | 2 | | 2.1 | | 2.2 | | 2.2 | | | 2.2 |
| External DBA (wt %) | 0.03 | 1.25 | 1.3 | 0.69 | 0.68 | ND | ND | 0.01 | ND | ND |
| Tg (° C.) | 145 | 135 | 134 | 139 | 141 | 148 | 148 | 150 | 150 | 150 |
| Yellowness Index | 46 | 27 | 26 | 30 | 30 | 38 | 36 | 41 | 41 | 43 |
| TMBPA (ppm) | 6780 | 7429 | 7583 | 6715 | 6747 | 4505 | 4515 | 3957 | 1871 | 1933 |
| Xylenol (ppm) | 100 | 36 | 24 | 0 | 31 | 0 | 0 | 0 | 0 | 0 |

"ND" means the external amine content was non-detectable using $^1$H NMR spectroscopy (detection limit is approximately 0.025 weight percent).

The properties of the isolated phenylene ether oligomer compositions using the methods of Examples 1-4 are further illustrated by FIGS. 2-5. In general, Examples 1 and 2 utilized a lower discharge temperature for the oligomer composition (e.g., 204 to 224° C.), while Examples 3 and 4 utilized higher discharge temperatures (e.g., 255 to 274° C.). Examples 1 and 3 demonstrate the effects of using a high feed rate and a short run time, while Examples 2 and 4 demonstrate a lower feed rate and a longer run time.

Figure 2:
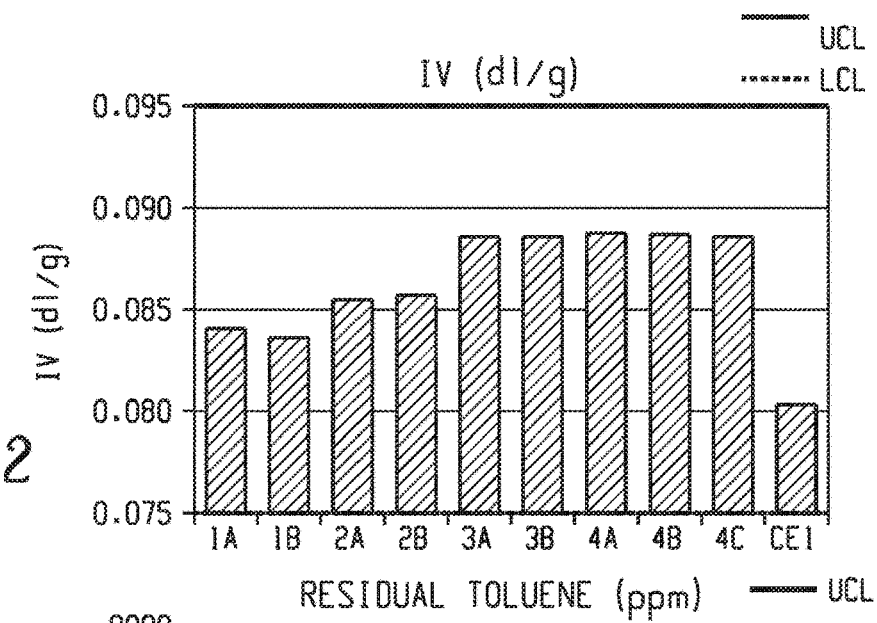
FIG. 2 shows intrinsic viscosity (in deciliter per gram) for phenylene ether oligomer compositions comprising a phenylene ether oligomer having an intrinsic viscosity of 0.09 deciliter per gram, where the compositions were isolated according to the methods described in Comparative Example 1 and Examples 1-4.

FIG. 2 shows the intrinsic viscosity (reported in deciliter per gram, dl/g) of the isolated phenylene ether oligomer composition. The isolated phenylene ether oligomers of Examples 1 and 2 exhibited lower intrinsic viscosities of about 0.083 to 0.086 deciliter per gram compared to Example 3 and 4, which exhibited intrinsic viscosities of about 0.088 to 0.089 deciliter per gram. The phenylene ether oligomer composition isolated by the method of Comparative Example 1 exhibited an intrinsic viscosity of about 0.08 to 0.081 deciliter per gram.

Figure 3:
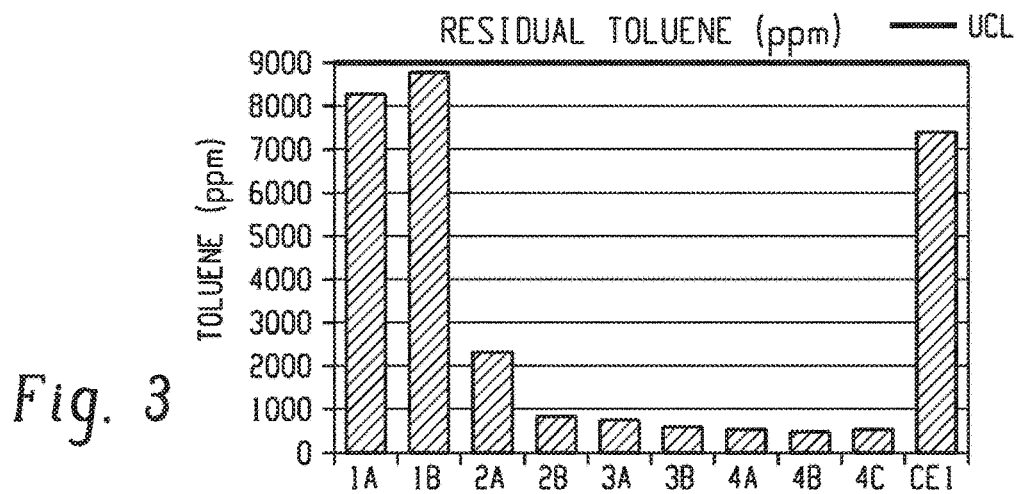
FIG. 3 shows amount of residual toluene in parts per million by weight for phenylene ether oligomer compositions comprising a phenylene ether oligomer having an intrinsic viscosity of 0.09 deciliter per gram, where the compositions were isolated according to the methods described in Comparative Example 1 and Examples 1-4.

FIG. 3 shows the residual toluene present in the isolated phenylene ether oligomer compositions for each of Examples 1-4 and Comparative Example 1. As shown in FIG. 3, Examples 2 through 4 generally provided phenylene ether oligomer compositions with substantially lower residual toluene amounts compared to the method of Example 1 and Comparative Example 1.

Figure 4:
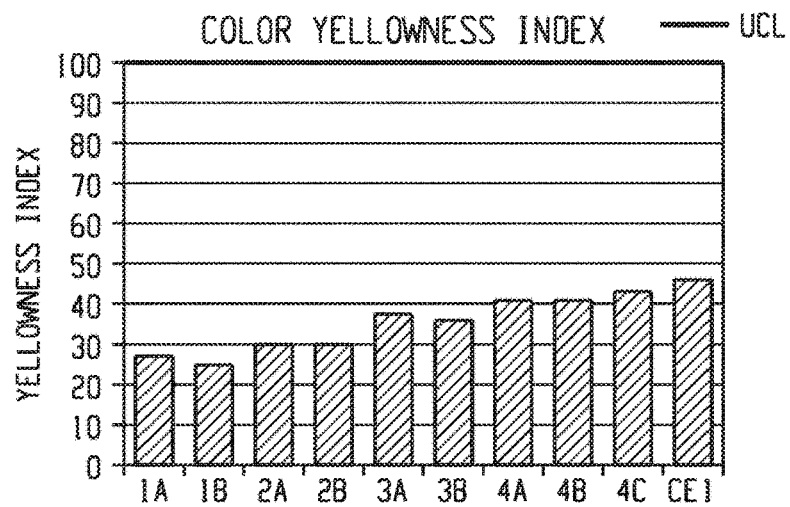
FIG. 4 shows yellowness index determined for solutions of phenylene ether oligomer compositions in toluene, comprising a phenylene ether oligomer having an intrinsic viscosity of 0.09 deciliter per gram, where the compositions were isolated according to the methods described in Comparative Example 1 and Examples 1-4.

FIG. 4 shows the yellowness index of the isolated phenylene ether oligomer compositions for each of Examples 1-4 and Comparative Example 1. The isolated phenylene ether oligomer composition of Comparative Example 1 exhibited a yellowness index of about 45. The isolated phenylene ether oligomer compositions of Examples 3 and 4 exhibited slightly reduced yellowness indices of about 35 to 43, and the isolate phenylene ether oligomer compositions of Examples 1 and 2 exhibited further reduced yellowness indices of about 25 to 30.

Figure 5:
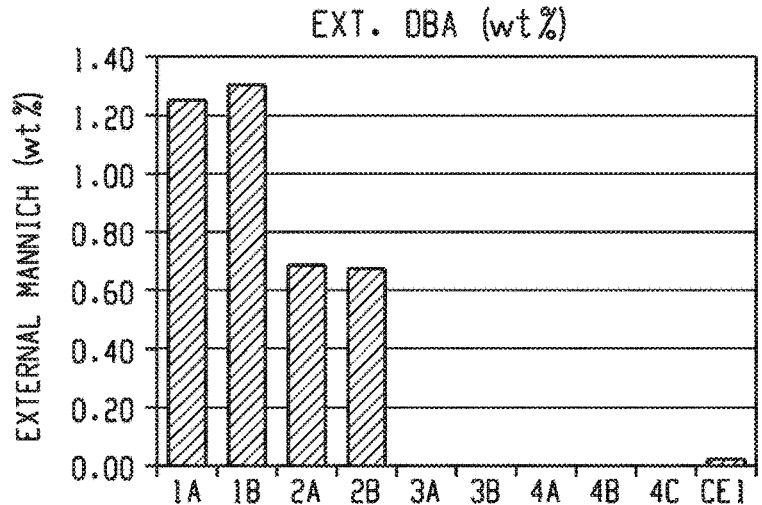
FIG. 5 shows weight percent external amine for phenylene ether oligomer compositions comprising a phenylene ether oligomer having an intrinsic viscosity of 0.09 deciliter per gram, where the compositions were isolated according to the methods described in Comparative Example 1 and Examples 1-4.

FIG. 5 shows the amount of external amines present in the isolated phenylene ether oligomer compositions for each of Examples 1-4 and Comparative Example 1. The method for isolating a phenylene ether oligomer according to Comparative Example 1 results in removal of external amine groups to non-detectable levels (determined by $^1$H NMR spectroscopy). Examples 1-4 demonstrate that the level of external amine present in the isolated phenylene ether oligomer composition can be tuned based on the process parameters, in particular, the temperature of the molten phenylene ether oligomer composition discharged from the TFE. The phenylene ether oligomer composition of Example 1 exhibited an external amine amount of 1.25 to 1.3 weight percent. The phenylene ether oligomer composition of Example 2 exhibited an external amine amount of 0.68 to 0.69 weight percent. The phenylene ether oligomer compositions of Examples 3 and 4 generally exhibited complete removal of external amines to non-detectable levels, with Example 4 exhibiting up to 0.01 weight percent.

Figure 6:
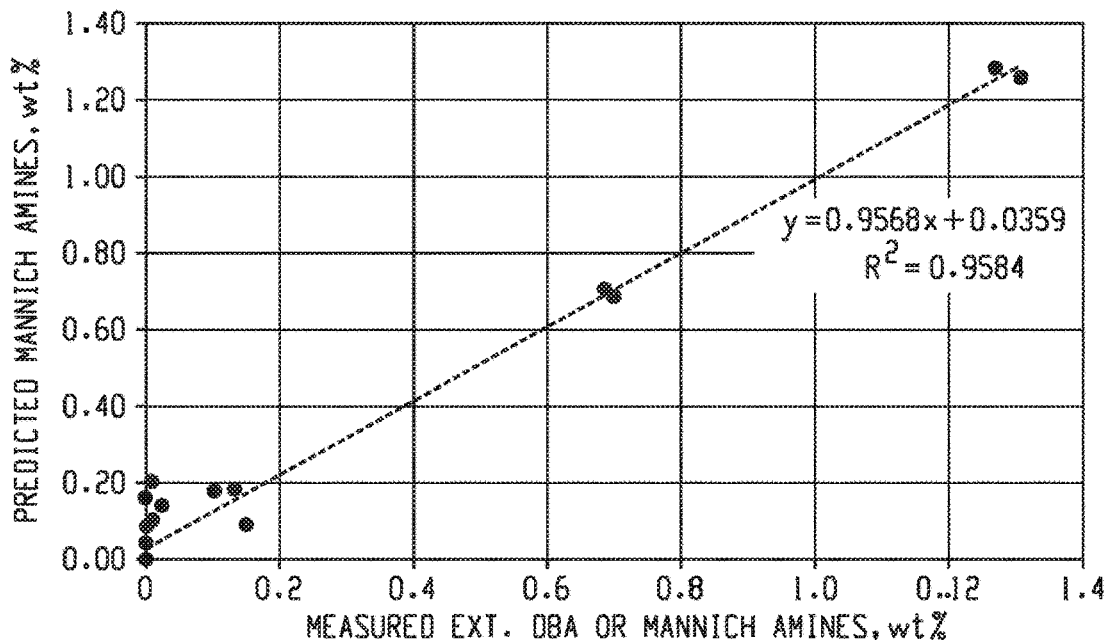
FIG. 6 shows the correlation between predicted and measured amounts of external amine present in the phenylene ether oligomer compositions.

The present inventors have unexpectedly found that the final amount of external amine groups present in the isolated phenylene ether oligomer can be predicted based on certain parameters including the solution feed temperature, the hot oil inlet temperature, and the molten phenylene ether oligomer composition discharge temperature. Based on these parameters and the results of Examples 1-4, the predicted amount of external amines was found to correlate with the measured amount of external amines, as shown in FIG. 6.

Figure 7:
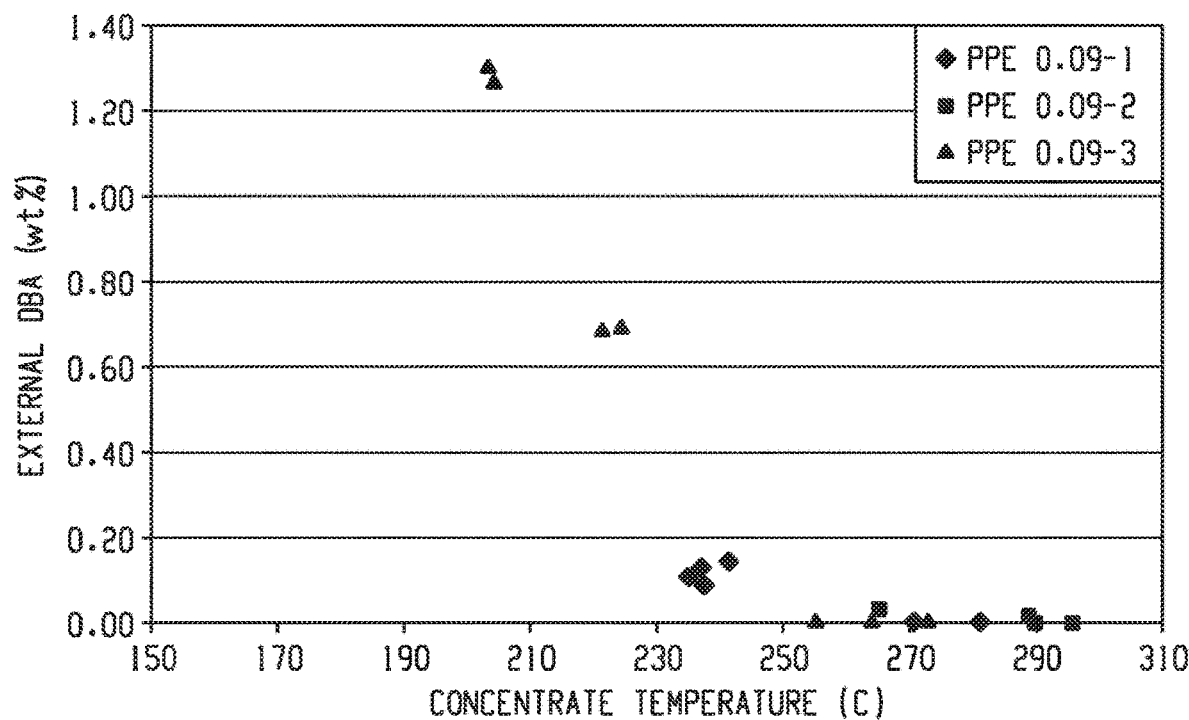
FIG. 7 shows the relationship between weight percent of external amine present in a phenylene ether oligomer composition and the temperature at which the phenylene ether oligomer composition was discharged from the thin film evaporator.

The molten phenylene ether oligomer composition discharge temperature was found to have a significant effect on the final amount of external amine groups present in the phenylene ether oligomer composition, as shown in FIG. 7. FIG. 7 shows the results of three trials of isolating a phenylene ether oligomer composition using varying discharge temperatures ("PPE 0.09-1", "PPE 0.09-2", and "PPE 0.09-3"). As shown in FIG. 7, for applications where it is desired to have less than 0.1 weight percent external amine groups present in the phenylene ether oligomer composition, maintaining a molten discharge temperature of greater than 250° C. appears to be preferable. For applications where increased amounts of external amine groups present in the phenylene ether oligomer composition are desired, lower discharge temperatures can be used (i.e., temperatures less than 250° C.).

Comparative Example 2

The same procedure as described for Comparative Example 1 was used, except that a PPE 0.12 phenylene ether oligomer was used.

Examples 5-7

For Examples 5A-5E, a 30% solution of PPE 0.12 oligomer and toluene as described above was fed to the TFE. The vacuum was maintained at 240 to 260 Torr and the rotor speed was maintained at 540 to 560 rotations per minute (RPM) so that the rotor tip speed was held constant at 4.2 to 4.35 meters per second. The oligomer solution was fed to the TFE at a rate of 65.7 to 70.3 kilograms per hour (145 to 155 pounds per hour). The TFE was operated to discharge a molten concentrated PPE 0.12 composition at a temperature of 268 to 272° C. Under these conditions, the external amine levels were 0.01 to 0.08 weight percent. The final residual toluene concentration was 80 to 110 ppm. The phenylene ether oligomer composition was substantially free of black specks.

For Examples 6A and 6B, a 30% solution of PPE 0.12 oligomer and toluene as described above was fed to the TFE as in Example 5, except that the PPE 0.12 oligomer solution was fed to the TFE at a rate of 113.4 to 114.8 kilograms per hour (250 to 253 pounds per hour), and the TFE was operated to discharge the molten concentrated PPE 0.12 composition at a temperature of 242 to 244° C. All other parameters were as in Example 5. Under these conditions the external amine levels were 0.1 to 0.8 weight percent, and the final residual toluene concentration was 4000 to 6500 ppm. The phenylene ether oligomer composition was substantially free of black specks.

For Examples 7A and 7B, a 30% solution of PPE 0.12 oligomer and toluene as described above was fed to the TFE as in Example 5, except that the rotor speed was maintained at 460 to 490 RPM so that the rotor tip speed was held at 3.6 to 3.8 meters per second. The PPE 0.12 oligomer solution was fed to the TFE at a rate of 66.2 to 68 kilograms per hour (146 to 150 pounds per hour), and the TFE was operated to discharge the molten concentrated PPE 0.12 composition at a temperature of 235 to 236° C. Under these conditions the external amine levels were 0.05 weight percent, and the final residual toluene concentration was 4000 to 4100 ppm. The phenylene ether oligomer composition was substantially free of black specks.

For Examples 8A-8D, a 30% solution of PPE 0.12 oligomer and toluene as described above was fed to the TFE as in Example 7, except that the T1th was operated to discharge the molten concentrated PPE 0.12 composition at a temperature of 268 to 273° C. Under these conditions the external amine levels were 0 to 0.02 weight percent, and the final residual toluene concentration was 2300 to 2400 ppm. The phenylene ether oligomer composition was substantially free of black specks.

The various process conditions of each of the above methods and the properties of the isolated phenylene ether oligomer compositions are summarized in Table 3. Number average molecular weight (Mn), weight average molecular weight (Mw), and dispersity (Đ) were determined using gel permeation chromatography (GPC) against polystyrene standards, eluting with chloroform as the mobile phase. "External DBA" refers to the weight percent of 3-methyl-4-hydroxy-5-di-n-butylaminomethylphenyl groups incorporated into the phenylene ether oligomer composition. Glass transition temperature (Tg) was determined by differential scanning calorimetry (DSC). "TMBPA" refers to residual 2,2-bis(3,5-dimethyl-4-hydroxyphenyl)propane as determined by gas chromatography. "Xylenol" refers to residual 2,6-dimethylphenol as determined by gas chromatography.

TABLE 3

| | CE2 | E5A | E5B | E5C | E5D | E5E | E6A | E6B |
|---|---|---|---|---|---|---|---|---|
| Rates | | | | | | | | |
| Feed Rate (kg/hr) | | 67.6 | 68 | 69.4 | 69.4 | 69.9 | 114.8 | 113.4 |
| Oligomer Rate (kg/hr) | | 21.7 | 22.2 | 23.6 | 23.6 | 24 | 82.6 | 79.8 |
| Distillate Rate (kg/hr) | | 45.8 | 45.8 | 45.8 | 45.8 | 45.8 | 32.2 | 33.6 |
| Split (% OH) | | 67.8 | 67.3 | 66.0 | 66.0 | 65.6 | 28.1 | 29.6 |
| Feed Concentration (wt % PPE) | | 38 | 38 | 38 | 38 | 38 | 38 | 38 |
| Steam Sparge (kg/hr) | | 0 | 0 | 0 | 0 | 0 | 0 | 0 |
| Nitrogen Sparge (kg/hr) | | 0.45 | 0.45 | 0.45 | 0.45 | 0.45 | 0.45 | 0.45 |
| $O_2$ levels (%) | | 3.6 | 3.1 | 3.5 | 4.3 | 3.2 | 4 | 4 |
| Temperatures (° C.) | | | | | | | | |
| Feed | | 69 | 63 | 63 | 63 | 59 | 80 | 80 |
| Vapor | | 96 | 93 | 96 | 95 | 95 | 85 | 85 |
| Heat in | | 291 | 286 | 286 | 286 | 286 | 261 | 261 |
| Heat out | | 287 | 282 | 283 | 282 | 282 | 257 | 257 |
| TFE Discharge concentrate | | 272 | 268 | 268 | 270 | 269 | 244 | 242 |
| Bottoms Pump Discharge | | 239 | 240 | 241 | 242 | 243 | 225 | 227 |
| Condenser CTW in | | 23 | 23 | 23 | 23 | 24 | 26 | 25 |
| Condenser CTW out | | 25 | 26 | 25 | 25 | 26 | 29 | 29 |
| Distillate | | 26 | 27 | 27 | 27 | 27 | 27 | 28 |
| Other TFE settings | | | | | | | | |
| Vacuum (Torr) | | 250 | 246 | 258 | 254 | 245 | 253 | 252 |
| Rotor RPM | | 560 | 543 | 564 | 562 | 549 | 558 | 552 |
| Hyd. Generator Amp | | 15 | 12 | 14.5 | 14 | 14.5 | 17 | 21 |
| Conc. Pump Setting (RPM) | | 23.3 | 23.3 | 28.2 | 27.6 | 27.9 | 26 | 26 |
| Analytical Results | | | | | | | | |
| Residual Toluene (ppm) | 7738 | 0 | 107 | 69 | 80 | 89 | 6512 | 4006 |
| Intrinsic Viscosity (dl/g) | 0.125 | 0.129 | 0.129 | 0.129 | 0.129 | 0.128 | 0.125 | 0.125 |
| Mw (g/mol) | 5834 | | | | | 6543 | | 6441 |
| Mn (g/mol) | 2586 | | | | | 3031 | | 2936 |
| Đ | 2.3 | | | | | 2.2 | | 2.2 |
| External DBA (wt %) | ND | ND | ND | ND | ND | ND | 0.08 | 0.01 |
| Tg (° C.)[2] | 167 | 171 | 172 | 170 | 171 | 168 | 154 | 168 |
| Yellowness Index | 28 | 33 | 33 | 31 | 34 | 33 | 25 | 23 |
| Xylenol (ppm) | 1193 | 0 | 0 | 0 | 0 | 0 | 3315 | 2157 |

| | E7A | E7B | E8A | E8B | E8C | E8D |
|---|---|---|---|---|---|---|
| Rates | | | | | | |
| Feed Rate (kg/hr) | 67.6 | 67.1 | 66.2 | 66.2 | 68 | 67.6 |
| Oligomer Rate (kg/hr) | 20.4 | 20 | 17.2 | 17.2 | 19 | 18.6 |
| Distillate Rate (kg/hr) | 47.2 | 47.2 | 49 | 49 | 49 | 49 |
| Split (% OH) | 69.8 | 70.3 | 74.0 | 74.0 | 72.0 | 72.5 |
| Feed Concentration (wt % PPE) | 38 | 38 | 38 | 38 | 38 | 38 |
| Steam Sparge (kg/hr) | 0 | 0 | 0 | 0 | 0 | 0 |
| Nitrogen Sparge (kg/hr) | 0.45 | 0.45 | 0.45 | 0.45 | 0.45 | 0.45 |
| $O_2$ levels (%) | 4 | 4 | 4 | 4 | 4 | 4 |
| Temperatures (° C.) | | | | | | |
| Feed | 74 | 69 | 68 | 68 | 68 | 70 |
| Vapor | 84 | 84 | 86 | 86 | 89 | 90 |
| Heat in | 230 | 230 | 272 | 272 | 272 | 272 |
| Heat out | 227 | 227 | 268 | 268 | 269 | 268 |

TABLE 3-continued

| | | | | | | |
|---|---|---|---|---|---|---|
| TFE Discharge concentrate | 235 | 236 | 268 | 268 | 272 | 273 |
| Bottoms Pump Discharge | 222 | 222 | 249 | 249 | 258 | 260 |
| Condenser CTW in | 26 | 26 | 26 | 26 | 26 | 26 |
| Condenser CTW out | 28 | 28 | 28 | 28 | 28 | 28 |
| Distillate | 28 | 29 | 29 | 29 | 29 | 29 |
| Other TFE settings | | | | | | |
| Vacuum (Torr) | 243 | 252 | 257 | 257 | 245 | 246 |
| Rotor RPM | 474 | 477 | 486 | 486 | 464 | 464 |
| Hyd. Generator Amp | 14 | 14 | 12.5 | 12.5 | 14.5 | 13.5 |
| Conc. Pump Setting (RPM) | 26 | 26 | 19 | 19 | 19 | 34 |
| Analytical Results | | | | | | |
| Residual Toluene (ppm) | 4110 | 4031 | 4196 | 2690 | 2276 | 2380 |
| Intrinsic Viscosity (dl/g) | 0.126 | 0.126 | 0.126 | 0.127 | 0.127 | 0.127 |
| Mw (g/mol) | | 6455 | | | | 6516 |
| Mn (g/mol) | | 2950 | | | | 2981 |
| Đ | | 2.2 | | | | 2.2 |
| External DBA (wt %) | 0.05 | 0.05 | 0.02 | ND | ND | ND |
| Tg (° C.)[2] | 168 | 167 | 170 | 167 | 168 | 173 |
| Yellowness Index | 26 | 29 | 27 | 32 | 30 | 28 |
| Xylenol (ppm) | 2163 | 2308 | 2513 | 1484 | 566 | 911 |

"ND" means the external amine content was non-detectable by $^1$H NMR spectroscopy (detection limit is approximately 0.025 weight percent).

The properties of the isolated phenylene ether oligomer compositions using the methods of Examples 5-8 are further illustrated by FIGS. 7-10. In general, Examples 6 and 7 utilized a lower discharge temperature for the oligomer composition (e.g., 235 to 245° C.), while Examples 5 and 8 utilized higher discharge temperatures (e.g., 265 to 275° C.). Example 6 demonstrates the effects of using a high feed rate and a short run time, while Examples 5, 7 and 8 demonstrate a lower feed rate and a longer run time.

Figure 8:
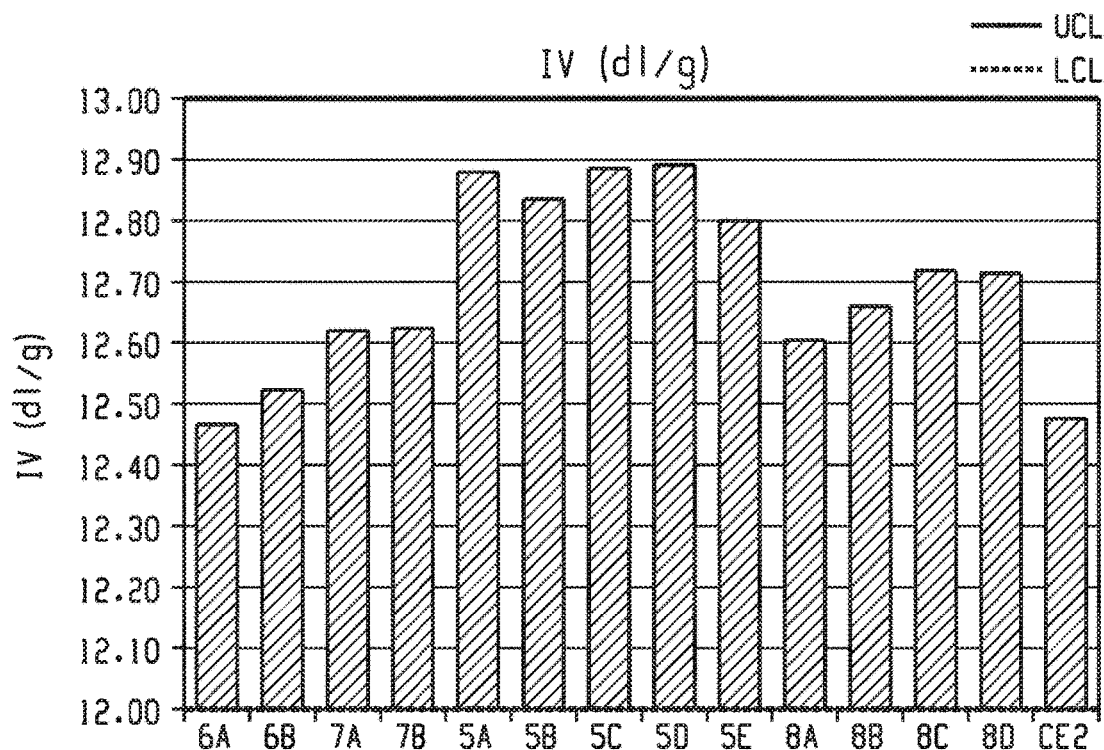
FIG. 8 shows intrinsic viscosity (in deciliter per gram) for phenylene ether oligomer compositions comprising a phenylene ether oligomer having an intrinsic viscosity of 0.12 deciliter per gram, where the compositions were isolated according to the methods described in Comparative Example 2 and Examples 5-8.

FIG. 8 shows the intrinsic viscosity (reported in deciliter per gram, dl/g) of the isolated phenylene ether oligomer composition. The isolated phenylene ether oligomer compositions of Example 5 exhibited the highest intrinsic viscosity of 0.128 to 0.129 deciliter per gram. The phenylene ether oligomer compositions of Example 6 through 8 exhibited intrinsic viscosities of 0.1245 to 0.1275 deciliter per gram. The phenylene ether oligomer composition obtained by the method of Comparative Example 2 exhibited an intrinsic viscosity of about 0.125 deciliter per gram.

Figure 9:
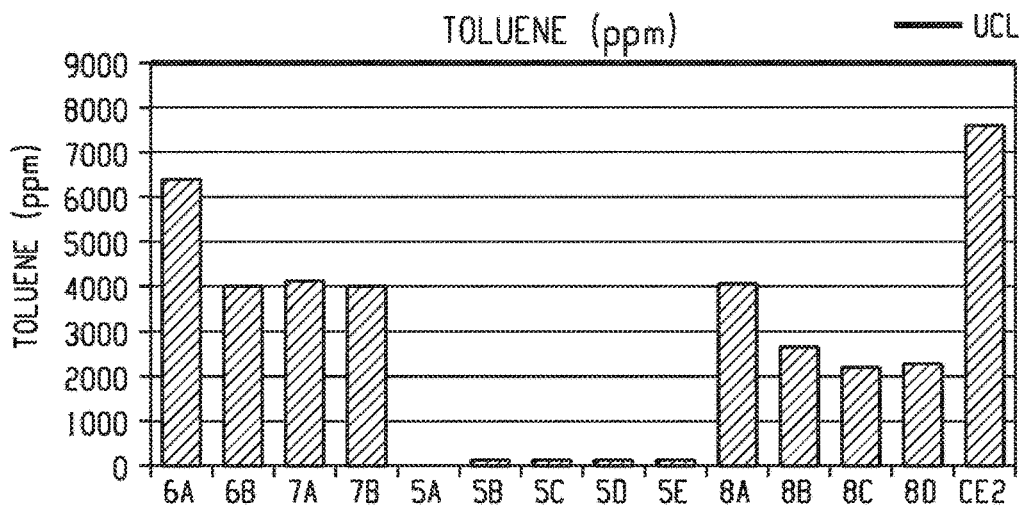
FIG. 9 shows amount of residual toluene in parts per million by weight for phenylene ether oligomer compositions comprising a phenylene ether oligomer having an intrinsic viscosity of 0.12 deciliter per gram, where the compositions were isolated according to the methods described in Comparative Example 2 and Examples 5-8.

FIG. 9 shows the residual toluene present in the isolate phenylene ether oligomer compositions for each of Examples 5-8 and Comparative Example 2. As shown in FIG. 8, Examples 5 through 8 generally provided phenylene ether oligomer compositions with substantially lower residual toluene amounts compared to the method of Comparative Example 2. Examples 6 and 7 contained 4000 to 6500 ppm of residual toluene, while Comparative Example 2 was found to contain about 7800 ppm of residual toluene. The phenylene ether oligomer compositions obtained by the method of Example 5 contained at most 107 ppm of residual toluene.

Figure 10:
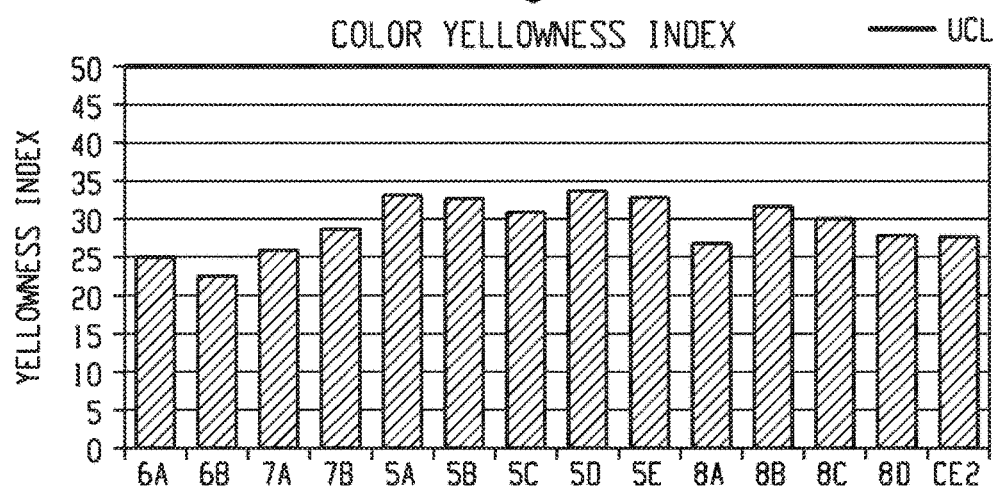
FIG. 10 shows yellowness index determined for solutions of phenylene ether oligomer compositions in toluene, comprising a phenylene ether oligomer having an intrinsic viscosity of 0.12 deciliter per gram, where the compositions were isolated according to the methods described in Comparative Example 2 and Examples 5-8.

FIG. 10 shows the yellowness index of the isolated phenylene ether oligomer compositions for each of Examples 5-8 and Comparative Example 2. The isolated phenylene ether oligomer composition of Comparative Example 2 exhibited a yellowness index of about 28. The isolated phenylene ether oligomer compositions of Examples 5-8 exhibited similar yellowness indices of about 20 to 35.

Figure 11:
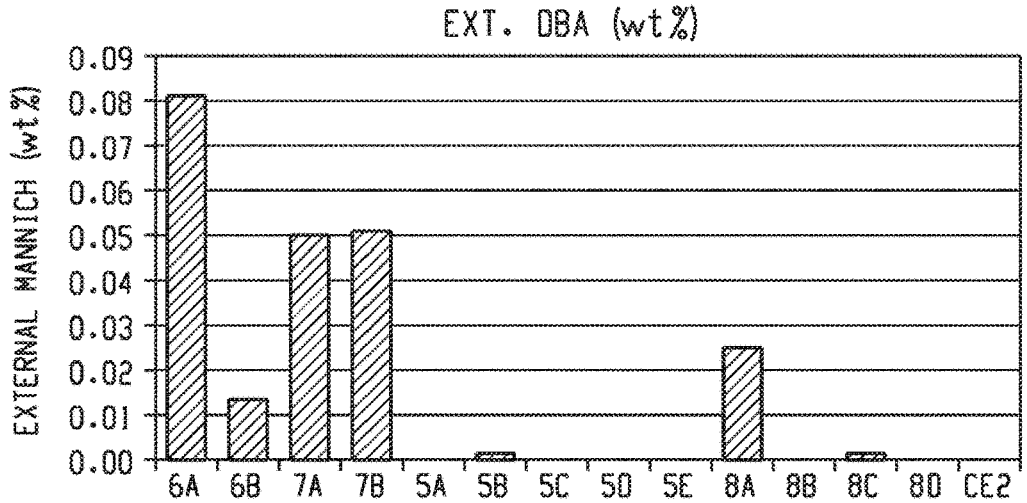
FIG. 11 shows weight percent external amine for phenylene ether oligomer compositions comprising a phenylene ether oligomer having an intrinsic viscosity of 0.12 deciliter per gram, where the compositions were isolated according to the methods described in Comparative Example 2 and Examples 5-8.

FIG. 11 shows the amount of external amine groups incorporated into the oligomer present in the isolated phenylene ether oligomer compositions for each of Examples 5-8 and Comparative Example 2. The method for isolating a phenylene ether oligomer according to Comparative Example 2 results in complete removal of external amines Examples 5-8 demonstrate that the level of external amine present in the isolated phenylene ether oligomer composition can be varied depending on the process used for isolation of the phenylene ther oligomer composition. The phenylene ether oligomer composition of Examples 5 and 8 exhibited a negligible external amine amount, except for Example 8A, containing about 0.02 weight percent of amines. The phenylene ether oligomer composition of Example 7 exhibited an external amine amount of 0.05 weight percent.

The invention includes at least the following embodiments.

Embodiment 1

A method for isolating a phenylene ether oligomer composition, the method comprising, feeding a solution comprising a solvent and a phenylene ether oligomer into a thin film evaporator comprising a cylindrical heating chamber and a rotor comprising one or more rotor blades, wherein an edge of the one or more rotor blades and an interior surface of the cylindrical heating chamber are separated by a distance of 0.5 to 3.5 millimeters; forming a film comprising the phenylene ether oligomer and the solvent on the interior surface of the cylindrical heating chamber; and heating the cylindrical heating chamber to devolatilize the solvent from the film to provide a phenylene ether oligomer composition having an intrinsic viscosity of 0.03 to 0.13 deciliter per gram and comprising: a phenylene ether oligomer having an external amine content of less than 1.5 weight percent; and a residual solvent in an amount of 0 to 10,000 parts per million by weight (ppm), based on the weight of the phenylene ether oligomer composition.

Embodiment 2

The method of embodiment 1, further comprising discharging the phenylene ether oligomer composition from the thin film evaporator.

Embodiment 3

The method of embodiment 2, wherein the discharging is at a temperature of 250 to 350° C., and the phenylene ether oligomer composition comprises a phenylene ether oligomer having an external amine content of less than 0.1 weight percent, based on the total weight of the phenylene ether oligomer composition.

Embodiment 4

The method of embodiment 2, wherein the discharging is at a temperature of less than 250° C., and the phenylene ether oligomer composition comprises a phenylene ether oligomer having an external amine content of 0.1 to 1.5 weight percent, based on the total weight of the phenylene ether oligomer composition.

Embodiment 5

The method of any one of embodiments 1 to 4, wherein the solution comprises 30 to 40 weight percent of the phenylene ether oligomer, based on the total weight of the solution.

Embodiment 6

The method of any one of embodiments 1 to 5, wherein feeding the solution to the thin film evaporator is at a temperature of 40 to 80° C.

Embodiment 7

The method of any one of embodiments 1 to 6, wherein the solution comprises a phenylene ether oligomer having an intrinsic viscosity of 0.05 to 0.1 deciliter per gram, and feeding the solution to the thin film evaporator is at a temperature of 40 to 50° C.

Embodiment 8

The method of any one of embodiments 1 to 6, wherein the solution comprises a phenylene ether oligomer having an intrinsic viscosity of greater than 0.1 to 0.15 deciliter per gram, and feeding the solution to the thin film evaporator is at a temperature of 55 to 80° C.

Embodiment 9

The method of any one of embodiments 1 to 8, wherein the phenylene ether oligomer composition has a zero shear melt viscosity of greater than 10,000 centipoise at 200° C.

Embodiment 10

The method of any one of embodiments 1 to 9, wherein the solvent comprises toluene, chloroform, methyl ethyl ketone, or a combination thereof.

Embodiment 11

The method of any one of embodiments 1 to 10, wherein the one or more rotor blades are rotating at a tip speed of 3.1 to 5.73 meters per second.

Embodiment 12

The method of any one of embodiments 1 to 11, wherein the phenylene ether oligomer composition is substantially free of black specks, as determined by visual inspection with the unaided eye of a Size 11 Grade 44 Ashless Whatman filter paper following filtration of a 20 weight percent solution comprising the phenylene ether oligomer composition.

Embodiment 13

The method of any one of embodiments 1 to 12, wherein a solution comprising the phenylene ether oligomer composition exhibits a yellowness index of 0 to 100.

Embodiment 14

The method of any one of embodiments 2 to 13, further comprising cooling the phenylene ether oligomer composition with a cooling device comprising a cooling belt.

Embodiment 15

The method of embodiment 1, wherein the solution comprises toluene and a phenylene ether oligomer having an intrinsic viscosity of 0.075 to 0.095 deciliter per gram; feeding the solution is at a temperature of 55 to 80° C.; the one or more rotor blades and an interior surface of the cylindrical heating chamber are separated by a distance of 0.8 to 1.2 millimeters; the rotor blades are rotating at a tip speed of 3.1 to 5.73 meters per second; and the phenylene ether oligomer composition comprises a phenylene ether oligomer having an external amine content of less than or equal to 1.3 weight percent, and wherein the phenylene ether oligomer composition has an intrinsic viscosity of 0.075 to 0.095 deciliter per gram; a residual solvent content of 10 to 10000 parts per million by weight, based on the weight of the phenylene ether oligomer composition; a glass transition temperature of 135 to 150° C.; and a solution comprising the phenylene ether oligomer composition has a yellowness index of 25 to 45.

Embodiment 16

The method of embodiment 1, wherein the solution comprises toluene and a phenylene ether oligomer having an intrinsic viscosity of 0.12 to 0.13 deciliter per gram; feeding the solution is at a temperature of 40 to 50° C.; the one or more rotor blades and an interior surface of the cylindrical heating chamber are separated by a distance of 0.8 to 1.2 millimeters; the rotor blades are rotating at a tip speed of 3.1 to 5.73 meters per second; and the phenylene ether oligomer composition comprises a phenylene ether oligomer having an external amine content of less than or equal to 0.1 weight percent, wherein the phenylene ether oligomer composition has an intrinsic viscosity of 0.125 to 0.13 deciliter per gram a residual solvent content of 10 to 6500 parts per million by weight, based on the weight of the phenylene ether oligomer composition; a glass transition temperature of 150 to 175°

C.; and a solution comprising the phenylene ether oligomer composition has a yellowness index of 20 to 35.

Embodiment 17

A phenylene ether oligomer composition comprising, a phenylene ether oligomer having an external amine content of less than or equal to 1.5 weight percent; and a residual solvent in an amount of 10 to 10000 parts per million by weight, based on the weight of the phenylene ether oligomer composition; wherein the phenylene ether oligomer composition has an intrinsic viscosity of 0.03 to 0.13 deciliter per gram; a glass transition temperature of 135 to 175° C.; and a solution comprising the phenylene ether oligomer composition has a yellowness index of 20 to 45.

Embodiment 18

The phenylene ether oligomer composition of embodiment 17, wherein the phenylene ether oligomer has an amine end group content of 0 to 1.3 weight percent; and the residual solvent is in an amount of 10 to 9000 parts per million by weight, based on the weight of the phenylene ether oligomer composition; and the phenylene ether composition has: an intrinsic viscosity of 0.075 to 0.095 deciliter per gram; a glass transition temperature of 135 to 150° C.; and a solution comprising the phenylene ether oligomer composition has yellowness index of 25 to 45.

Embodiment 19

The phenylene ether oligomer composition of embodiment 17, wherein the phenylene ether oligomer has an amine end group content of less than or equal to 0.1 weight percent; and the residual solvent is in an amount of 10 to 6500 parts per million by weight, based on the weight of the phenylene ether oligomer composition; and the phenylene ether composition has: an intrinsic viscosity of 0.125 to 0.13 deciliter per gram; a glass transition temperature of 150 to 175° C.; and a solution comprising the phenylene ether oligomer composition has a yellowness index of 20 to 35.

The invention claimed is:

1. A method for isolating a phenylene ether oligomer composition, the method comprising,
   feeding a solution comprising a solvent and a phenylene ether oligomer into a thin film evaporator comprising a cylindrical heating chamber and a rotor comprising one or more rotor blades, wherein an edge of the one or more rotor blades and an interior surface of the cylindrical heating chamber are separated by a distance of 0.5 to 3.5 millimeters;
   forming a film comprising the phenylene ether oligomer and the solvent on the interior surface of the cylindrical heating chamber; and
   heating the cylindrical heating chamber to devolatilize the solvent from the film to provide a phenylene ether oligomer composition having an intrinsic viscosity of 0.03 to 0.13 deciliter per gram and a zero shear melt viscosity of greater than 10,000 centipoise at 200° C. and comprising:
   a phenylene ether oligomer having an external amine content of less than 1.5 weight percent; and
   a residual solvent in an amount of 0 to 10,000 parts per million by weight (ppm), based on the weight of the phenylene ether oligomer composition.

2. The method of claim 1, further comprising discharging the phenylene ether oligomer composition from the thin film evaporator.

3. The method of claim 2, wherein the discharging is at a temperature of 250 to 350° C., and the phenylene ether oligomer composition comprises a phenylene ether oligomer having an external amine content of less than 0.1 weight percent, based on the total weight of the phenylene ether oligomer composition.

4. The method of claim 2, wherein the discharging is at a temperature of less than 250° C., and the phenylene ether oligomer composition comprises a phenylene ether oligomer having an external amine content of 0.1 to 1.5 weight percent, based on the total weight of the phenylene ether oligomer composition.

5. The method of claim 1, wherein the solution comprises 30 to 40 weight percent of the phenylene ether oligomer, based on the total weight of the solution.

6. The method of claim 1, wherein feeding the solution to the thin film evaporator is at a temperature of 40 to 80° C.

7. The method of claim 1, wherein the solution comprises a phenylene ether oligomer having an intrinsic viscosity of 0.05 to 0.1 deciliter per gram, and feeding the solution to the thin film evaporator is at a temperature of 40 to 50° C.

8. The method of claim 1, wherein the solution comprises a phenylene ether oligomer having an intrinsic viscosity of greater than 0.1 to 0.13 deciliter per gram, and feeding the solution to the thin film evaporator is at a temperature of 55 to 80° C.

9. The method of claim 1, wherein the solvent comprises toluene, chloroform, methyl ethyl ketone, or a combination thereof.

10. The method of claim 1, wherein the one or more rotor blades are rotating at a tip speed of 3.1 to 5.73 meters per second.

11. The method of claim 1, wherein the phenylene ether oligomer composition is substantially free of black specks, as determined by visual inspection with the unaided eye of a Size 11 Grade 44 Ashless Whatman filter paper following filtration of a 20 weight percent solution comprising the phenylene ether oligomer composition.

12. The method of claim 1, wherein a solution comprising the phenylene ether oligomer composition exhibits a yellowness index of 0 to 100.

13. The method of claim 2, further comprising cooling the phenylene ether oligomer composition with a cooling device comprising a cooling belt.

14. The method of claim 1, wherein the solution comprises toluene and a phenylene ether oligomer having an intrinsic viscosity of 0.075 to 0.095 deciliter per gram;
   feeding the solution is at a temperature of 55 to 80° C.;
   the one or more rotor blades and an interior surface of the cylindrical heating chamber are separated by a distance of 0.8 to 1.2 millimeters;
   the rotor blades are rotating at a tip speed of 3.1 to 5.73 meters per second; and
   the phenylene ether oligomer composition comprises a phenylene ether oligomer having an external amine content of less than or equal to 1.3 weight percent, and wherein the phenylene ether oligomer composition has an intrinsic viscosity of 0.075 to 0.095 deciliter per gram;
   a residual solvent content of 10 to 10000 parts per million by weight, based on the weight of the phenylene ether oligomer composition;

a glass transition temperature of 135 to 150° C.; and
a solution comprising the phenylene ether oligomer composition has a yellowness index of 25 to 45.

15. The method of claim 1, wherein the solution comprises toluene and a phenylene ether oligomer having an intrinsic viscosity of 0.12 to 0.13 deciliter per gram;
feeding the solution is at a temperature of 40 to 50° C.;
the one or more rotor blades and an interior surface of the cylindrical heating chamber are separated by a distance of 0.8 to 1.2 millimeters;
the rotor blades are rotating at a tip speed of 3.1 to 5.73 meters per second; and
the phenylene ether oligomer composition comprises a phenylene ether oligomer having an external amine content of less than or equal to 0.1 weight percent, wherein the phenylene ether oligomer composition has an intrinsic viscosity of 0.125 to 0.13 deciliter per gram
a residual solvent content of 10 to 6500 parts per million by weight, based on the weight of the phenylene ether oligomer composition;
a glass transition temperature of 150 to 175° C.; and
a solution comprising the phenylene ether oligomer composition has a yellowness index of 20 to 35.

\* \* \* \* \*